US008576459B2

United States Patent
Nagata

(10) Patent No.: US 8,576,459 B2
(45) Date of Patent: Nov. 5, 2013

(54) ERECTING EQUAL-MAGNIFICATION LENS ARRAY PLATE, OPTICAL SCANNING UNIT, AND IMAGE READING DEVICE

(75) Inventor: Hideshi Nagata, Minato-ku (JP)

(73) Assignee: Nippon Sheet Glass Company, Limited, Tokyo (JP)

( * ) Notice: Subject to any disclaimer, the term of this patent is extended or adjusted under 35 U.S.C. 154(b) by 69 days.

(21) Appl. No.: 13/293,848

(22) Filed: Nov. 10, 2011

(65) Prior Publication Data

US 2012/0120462 A1    May 17, 2012

(30) Foreign Application Priority Data

Nov. 11, 2010 (JP) ................................. 2010-252916

(51) Int. Cl.
*H04N 1/04* (2006.01)
(52) U.S. Cl.
USPC ............ 358/475; 358/474; 358/509; 359/622
(58) Field of Classification Search
USPC .................... 358/474, 475, 483, 482, 509; 359/201.1, 622, 619
See application file for complete search history.

(56) References Cited

U.S. PATENT DOCUMENTS

| | | | |
|---|---|---|---|
| 7,187,867 B2* | 3/2007 | Kawabe et al. ............... | 398/126 |
| 7,234,822 B2* | 6/2007 | Uchiyama et al. ............ | 353/102 |
| 7,289,249 B2* | 10/2007 | Sone ............................. | 358/461 |
| 7,319,244 B2* | 1/2008 | Liu et al. ........................ | 257/98 |
| 7,548,352 B2* | 6/2009 | Sakurai et al. ................ | 358/475 |
| 7,777,958 B2* | 8/2010 | Shimmo et al. ............... | 359/622 |
| 8,014,072 B2* | 9/2011 | Nagata .......................... | 359/621 |
| 8,077,407 B2* | 12/2011 | Shimmo et al. ............... | 359/811 |
| 8,238,028 B2* | 8/2012 | Shiraishi ....................... | 359/622 |
| 8,446,647 B2* | 5/2013 | Mamada et al. .............. | 358/475 |
| 2006/0192155 A1* | 8/2006 | Algots et al. ............... | 250/504 R |
| 2008/0192155 A1* | 8/2008 | Uchiyama ........................ | 349/8 |
| 2009/0141362 A1* | 6/2009 | Shimmo et al. ............... | 359/622 |
| 2010/0020421 A1* | 1/2010 | Shimmo et al. ............... | 359/811 |
| 2010/0067070 A1* | 3/2010 | Mamada et al. .............. | 358/475 |

FOREIGN PATENT DOCUMENTS

JP        2005-037891 A     2/2005

* cited by examiner

*Primary Examiner* — Negussie Worku
(74) *Attorney, Agent, or Firm* — Sughrue Mion, PLLC

(57) ABSTRACT

An erecting equal-magnification lens array plate includes: a first lens array plate provided with a plurality of first lenses arranged on a first surface and a plurality of second lenses arranged on a second surface opposite to the first surface; and a second lens array plate provided with a plurality of third lenses arranged on a third surface and a plurality of fourth lenses arranged on a fourth surface opposite to the third surface. The first and second lens array plates form a stack such that the second surface and the third surface face each other. The erecting equal-magnification lens array plate receives light from a linear light source facing the first surface and forms an erect equal-magnification image of the linear light source on an image plane facing the fourth surface. An annular slope is formed around each second lens and each third lens.

8 Claims, 22 Drawing Sheets

| CONDITION | TOTAL NOISE RATIO | GHOST NOISE RATIO | FLARE NOISE RATIO |
|---|---|---|---|
| COMPARATIVE EXAMPLE 1 | 63.84% | 18.22% | 45.62% |
| COMPARATIVE EXAMPLE 2 | 45.52% | 0.00% | 45.52% |
| EMBODIMENT | 45.15% | 0.00% | 45.15% |

| CONDITION | TOTAL NOISE RATIO | GHOST NOISE RATIO | FLARE NOISE RATIO |
|---|---|---|---|
| COMPARATIVE EXAMPLE 3 | 18.27% | 18.22% | 0.05% |
| COMPARATIVE EXAMPLE 4 | 0.03% | 0.00% | 0.03% |
| EMBODIMENT | 0.04% | 0.00% | 0.04% |

FIG.24

| CONDI-TION | LENS PITCH | SLOPE ANGLE | TOTAL NOISE RATIO | GHOST NOISE RATIO | FLARE NOISE RATIO |
|---|---|---|---|---|---|
| 1 | 0.65mm | 55° | 0.04% | 0.00% | 0.04% |
| 2 | 0.67mm | 50.8° | 0.04% | 0.00% | 0.04% |
| 3 | 0.80mm | 32° | 0.04% | 0.00% | 0.04% |
| 4 | 0.82mm | 30.8° | 0.12% | 0.00% | 0.12% |
| 5 | 0.90mm | 25° | 0.61% | 0.00% | 0.61% |
| 6 | 0.95mm | 22° | 1.36% | 0.00% | 1.36% |
| 7 | 1.00mm | 20° | 1.98% | 0.00% | 1.98% |

ERECTING EQUAL-MAGNIFICATION LENS ARRAY PLATE, OPTICAL SCANNING UNIT, AND IMAGE READING DEVICE

BACKGROUND OF THE INVENTION

1. Field of the Invention

The present invention relates to an erecting equal-magnification lens array plate used in image reading devices, and to an optical scanning unit and an image reading device in which the erecting equal-magnification lens array plate is used.

2. Description of the Related Art

Some image reading devices such as scanners are known to use erecting equal-magnification optical systems. Erecting equal-magnification optics are capable of reducing the size of devices better than reduction optics. In the case of image reading devices, an erecting equal-magnification optical system comprises a linear light source, an erecting equal-magnification lens array, and a line image sensor.

A rod lens array capable of forming an erect equal-magnification image is used as an erecting equal-magnification lens array in an erecting equal-magnification optical system. Normally, a rod lens array comprises an arrangement of rod lenses in the longitudinal direction (main scanning direction of the image reading device) of the lens array. By increasing the number of rows of rod lenses, the light transmissibility is improved and unevenness in the amount of light transmitted is reduced. Due to price concerns, it is common to use one or two rows of rod lenses in a rod.

Meanwhile, an erecting equal-magnification lens array plate could be formed as a stack of a plurality of transparent lens array plates built such that the light axes of individual convex lenses are aligned, where each transparent lens array plate includes a systematic arrangement of micro-convex lenses on one or both surfaces of the plate. Since an erecting equal-magnification lens array plate such as this can be formed by, for example, injection molding, erecting equal-magnification lens arrays in a plurality of rows can be manufactured at a relatively low cost.

[Patent Document No. 1] JP2005-37891

An erecting equal-magnification lens array plate lacks a wall for beam separation between adjacent lenses. Therefore, there is a problem of stray light wherein a light beam diagonally incident on an erecting equal-magnification lens array plate travels diagonally inside the plate and enters an adjacent convex lens, creating ghost noise as it leaves the plate.

SUMMARY OF THE INVENTION

The present invention addresses the aforementioned disadvantage and a purpose thereof is to provide an erecting equal-magnification lens array plate capable of reducing ghost noise and to provide an optical scanning unit and an image reading device in which the erecting equal-magnification lens array plate is used.

To address the issue described above, the erecting equal-magnification lens array plate comprises: a first lens array plate provided with a plurality of first lenses systematically arranged on a first surface and a plurality of second lenses systematically arranged on a second surface opposite to the first surface; and a second lens array plate provided with a plurality of third lenses systematically arranged on a third surface and a plurality of fourth lenses systematically arranged on a fourth surface opposite to the third surface. The first lens array plate and the second lens array plate form a stack such that the second surface and the third surface face each other to ensure that a combination of the lenses aligned with each other form a coaxial lens system, and the erecting equal-magnification lens array plate receives light from a linear light source facing the first surface and forms an erect equal-magnification image of the linear light source on an image plane facing the fourth surface. In this erecting equal-magnification lens array plate, an annular slope is formed around each second lens and/or each third lens.

According to the embodiment, at least a part of the light beam diagonally incident from the linear light source on the first lens array plate is refracted or reflected by the annular slope formed around each second lens and/or each third lens so that the likelihood of the light beam directly passing through the second lens array plate is reduced. This will reduce ghost noise more successfully than in the case where a flat part is provided between the second lenses and between the third lenses.

The slope may be formed to radially extend from the outer periphery of each second lens and/or each third lens in a tapered shape. The angle of the slope may be defined so that a light beam incident on the slope is totally reflected. The height of the slope may be equal to the sag of the second lens and/or the third lens.

The erecting equal-magnification lens array plate may further comprise: a first light-shielding wall having a plurality of first through holes aligned with the first lenses, and provided on the first surface such that each of the first through holes is located directly opposite to the corresponding first lens; and a second light-shielding wall having a plurality of second through holes aligned with the fourth lenses, and provided on the fourth surface such that each of the second through holes is located directly opposite to the corresponding fourth lens. At least one of the first through hole and the second through hole may comprise: a lateral wall portion; an annular inner projection portion provided to project from an end of the lateral wall portion facing the lens; and an annular outer projection portion provided to project from an end of the lateral wall portion opposite to the end facing the lens, wherein the inner projection portion and the outer projection portion may not be formed with a surface parallel to an optical axis.

The inner projection portion may be formed to be tapered. The outer projection portion may also be formed to be tapered.

Another embodiment of the present invention relates to an optical scanning unit. The optical scanning unit comprises: a linear light source configured to illuminate an image to be read; the erecting equal-magnification lens array plate according to claim 1 configured to condense light reflected by the image to be read; and a line image sensor configured to receive light transmitted through the erecting equal-magnification lens array plate.

According to the embodiment, the optical scanning unit is configured using the aforementioned erecting equal-magnification lens array plate and so can read an erect equal-magnification image in which ghost noise is reduced.

Still another embodiment of the present invention relates to an image reading device. The device comprises: the aforementioned optical scanning unit; and an image processing unit configured to process an image signal detected by the optical scanning unit.

According to the embodiment, the image reading device is configured using the aforementioned optical scanning unit so that high-quality image data in which ghost noise is suitably reduced can be obtained.

Optional combinations of the aforementioned constituting elements, and implementations of the invention in the form of methods, apparatuses, systems, computer programs, data structures, and recording mediums may also be practiced as additional modes of the present invention.

BRIEF DESCRIPTION OF THE DRAWINGS

FIG. 24 shows a result of simulation of noise ratio performed in the erecting equal-magnification lens array plate shown in FIG. 22 such that the angle of the slope is varied;

DETAILED DESCRIPTION OF THE INVENTION

The invention will now be described by reference to the preferred embodiments. This does not intend to limit the scope of the present invention, but to exemplify the invention.

Figure 1:
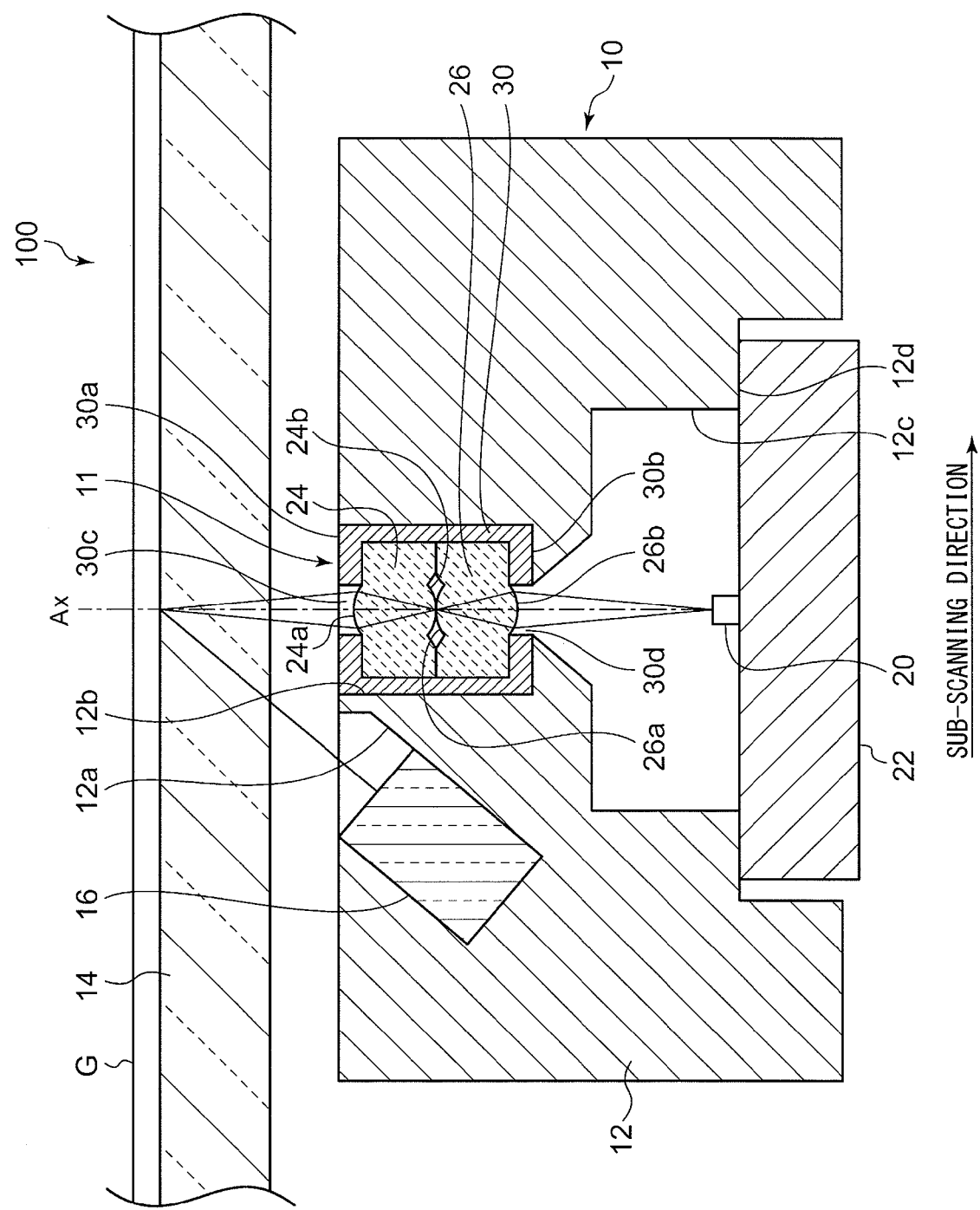
FIG. 1 shows an image reading device according to an embodiment of the present invention.

FIG. 1 shows an image reading device 100 according to an embodiment of the present invention. As shown in FIG. 1, the image reading device 100 comprises an optical scanning unit 10, a glass plate 14 on which a document G is placed, a driving mechanism (not shown) for driving the optical scanning unit 10, and an image processing unit (not shown) for processing data read by the optical scanning unit 10.

The optical scanning unit 10 comprises a linear light source 16 for illuminating a document G placed on a glass plate 14, an erecting equal-magnification lens array plate 11 for condensing light reflected from the document G, a line image sensor (photoelectric transducer) 20 for receiving light condensed by the erecting equal-magnification lens array plate 11, and a housing 12 for housing the linear light source 16, the erecting equal-magnification lens array plate 11, and the line image sensor 20.

The housing 12 is substantially rectangular solid in shape. A first recess 12a and a second recess 12b are formed in the upper part of the housing 12 and a third recess 12c is formed in the lower part. The housing 12 is formed injection-molding a resin. By forming the housing 12 by injection molding, the housing 12 can be formed easily at a low cost. The linear light source 16 is diagonally fixed inside the first recess 12a. The linear light source 16 is secured such that the optical axis of the illuminating light passes through the intersection point of the optical axis Ax of the erecting equal-magnification lens array plate 11 and the top surface of the glass plate 14.

The erecting equal-magnification lens array plate 11 is fitted in the second recess 12b. A substrate 22 provided with the line image sensor 20 is fitted in the third recess 12c. The substrate 22 is secured such that the top surface thereof is in contact with a step 12d provided in the third recess 12c.

As described later, the erecting equal-magnification lens array plate 11 comprises a stack of a first lens array plate 24 and a second lens array plate 26 such that pairs of corresponding lenses form coaxial lens systems, where each lens array plate is formed with a plurality of convex lenses on both planes of the plate. The first lens array plate 24 and the second lens array plate 26 are held by a holder 30 in a stacked state. The erecting equal-magnification lens array plate 11 is installed in the image reading device 100 such that the longitudinal direction thereof is aligned with the main scanning direction and the lateral direction thereof is aligned with the sub-scanning direction.

The erecting equal-magnification lens array plate 11 is configured to receive linear light reflected from the document G located above and form an erect equal-magnification image on an image plane located below, i.e., a light-receiving surface of the line image sensor 20. The image reading device 100 can read the document G by scanning the optical scanning unit 10 in the sub-scanning direction.

Figure 2:
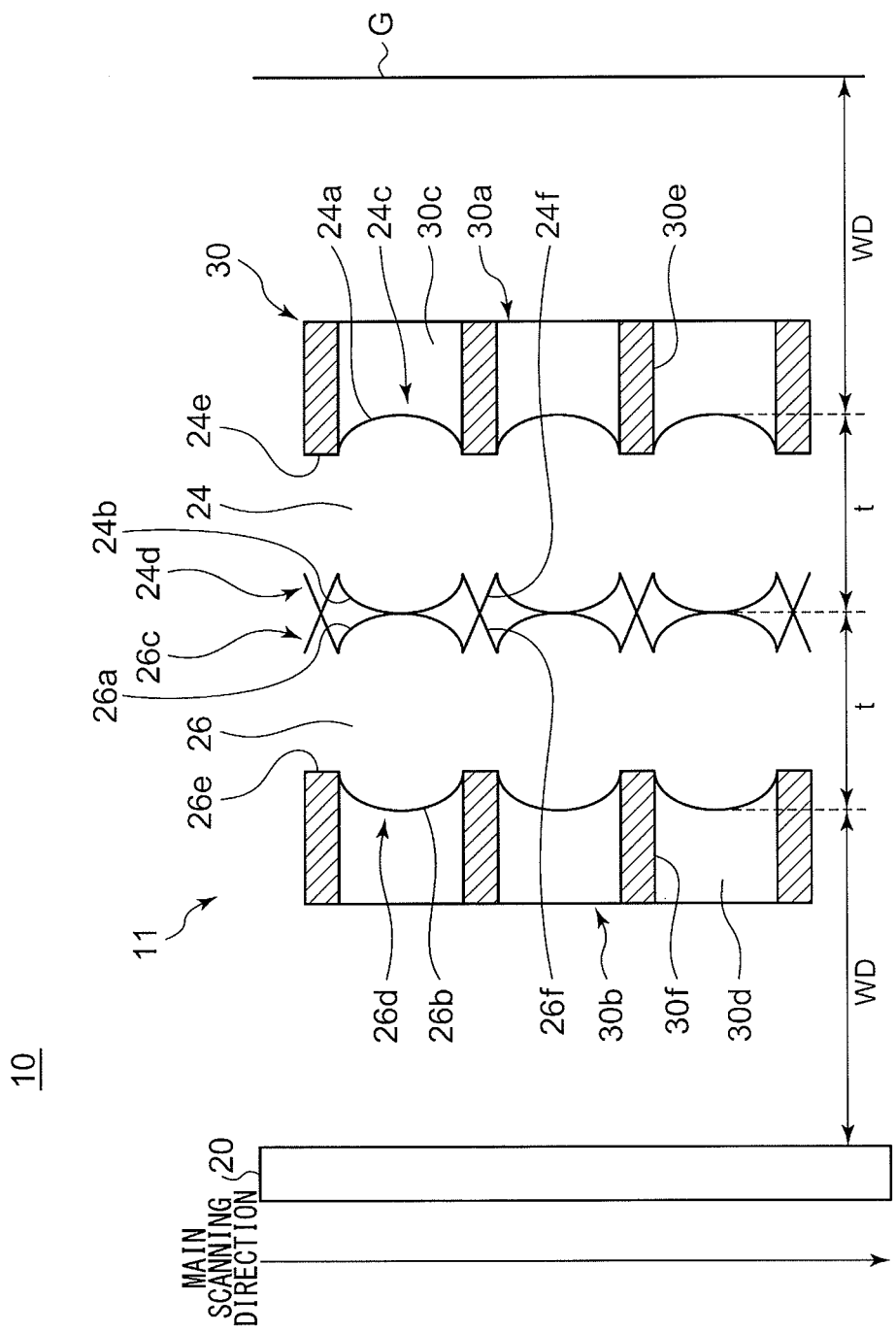
FIG. 2 shows a partial cross section of the optical scanning unit in the main scanning direction.
Figure 3:
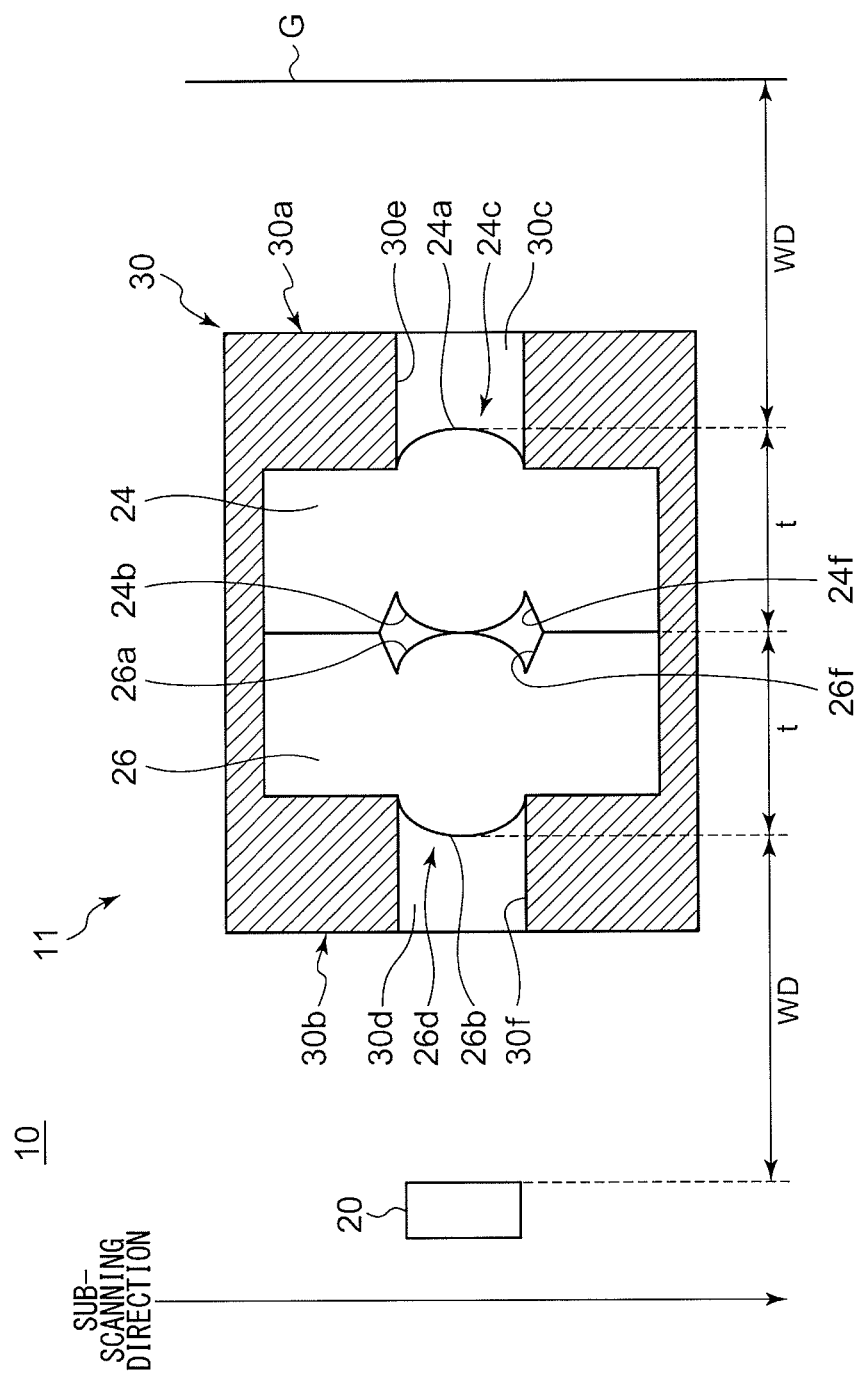
FIG. 3 shows a cross section of the optical scanning unit in the sub-scanning direction.

FIG. 2 shows a partial cross section of the optical scanning unit 10 in the main scanning direction. Referring to FIG. 2, the vertical direction represents the main scanning direction and the depth direction represents the sub-scanning direction. FIG. 3 shows a cross section of the optical scanning unit 10 in the sub-scanning direction. Referring to FIG. 3, the vertical direction represents the sub-scanning direction and the depth direction represents the main scanning direction.

As described above, the erecting equal-magnification lens array plate 11 comprises a stack of the first lens array plate 24 and the second lens array plate 26. The first lens array plate 24 and the second lens array plate 26 are rectangular plates having a thickness of t. A plurality of convex lenses are arranged on both surfaces of the plate. In other words, a plurality of first lenses 24a are systematically arranged on a first surface 24c of the first lens array plate 24, and a plurality of second lenses 24b are systematically arranged on a second surface 24d opposite to the first surface 24c. A plurality of third lenses 26a are systematically arranged on a third surface 26c of the second lens array plate 26, and a plurality of fourth lenses 26b are systematically arranged on a fourth surface 26d opposite to the third surface 26c. According to the embodiment, it is assumed that the first lens 24a, the second lens 24b, the third lens 26a, and the fourth lens 26b are spherical in shape. Alternatively, the lenses may have aspherical shapes.

The first lens array plate 24 and the second lens array plate 26 are formed by injection molding. Preferably, each of the first lens array plate 24 and the second lens array plate 26 is formed of a material amenable to injection molding, having high light transmittance in a desired wavelength range, and having low water absorbability. Desired materials include cycloolefin resins, olefin resins, norbornene resins, and polycarbonate.

Figure 4:
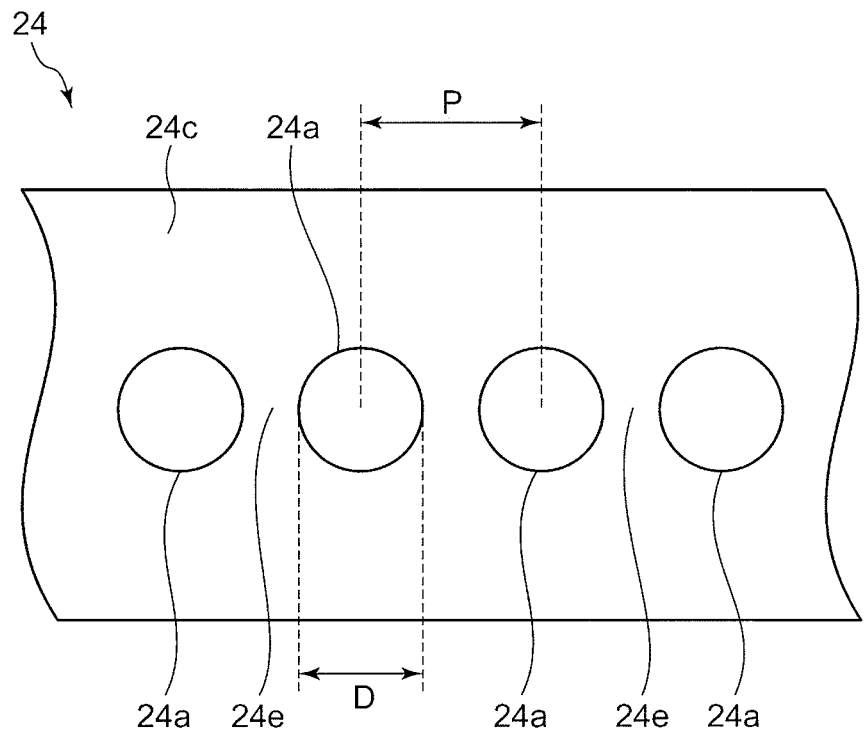
FIG. 4 is a top view showing the first surface of the first lens array plate.

FIG. 4 is a top view showing the first surface 24c of the first lens array plate 24. As shown in FIG. 4, the plurality of first lenses 24a are arranged in a single line on the first surface 24c at a lens pitch P in the longitudinal direction of the first lens array plate 24. The lens diameter D of the first lens 24a is configured to be smaller than the lens pitch P. Therefore, a flat part 24e not formed with a lens is provided between adjacent first lenses 24a.

Figure 5:
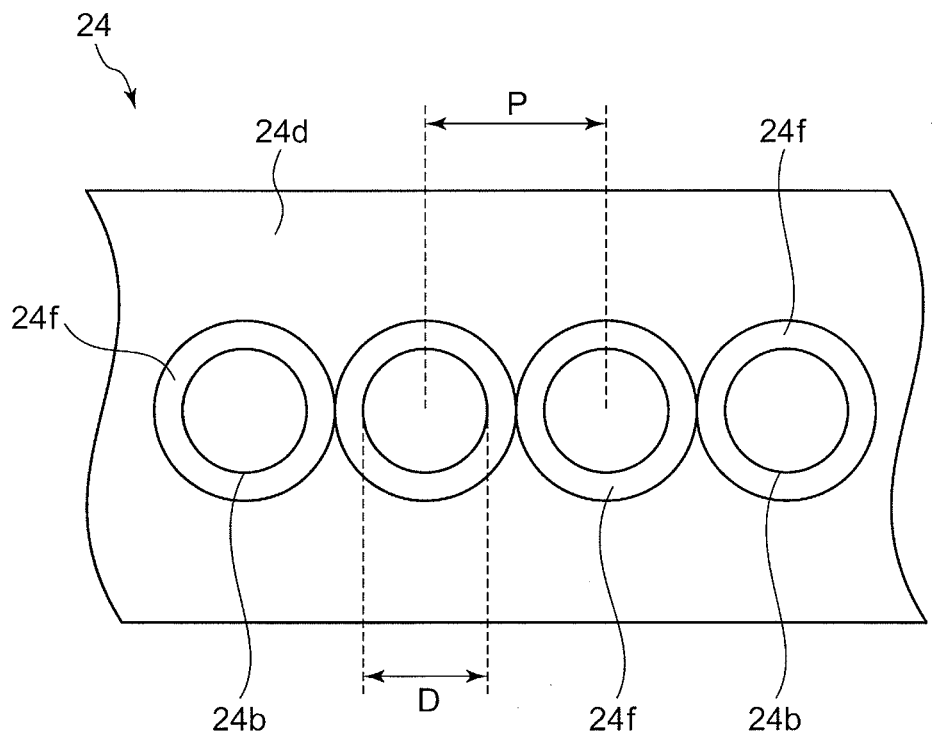
FIG. 5 is a top view showing the second surface of the first lens array plate.

FIG. 5 is a top view showing the second surface 24d of the first lens array plate 24. As shown in FIG. 5, the plurality of second lenses 24b are arranged in a single line on the second surface 24d in the longitudinal direction of the first lens array plate 24 at a lens pitch P identical to the lens pitch of the first lenses 24a. The lens diameter D of the second lens 24b is configured to be identical to that of the first lens 24a. The first lens 24a and the second lens 24b may have different lens diameters.

Figure 6:
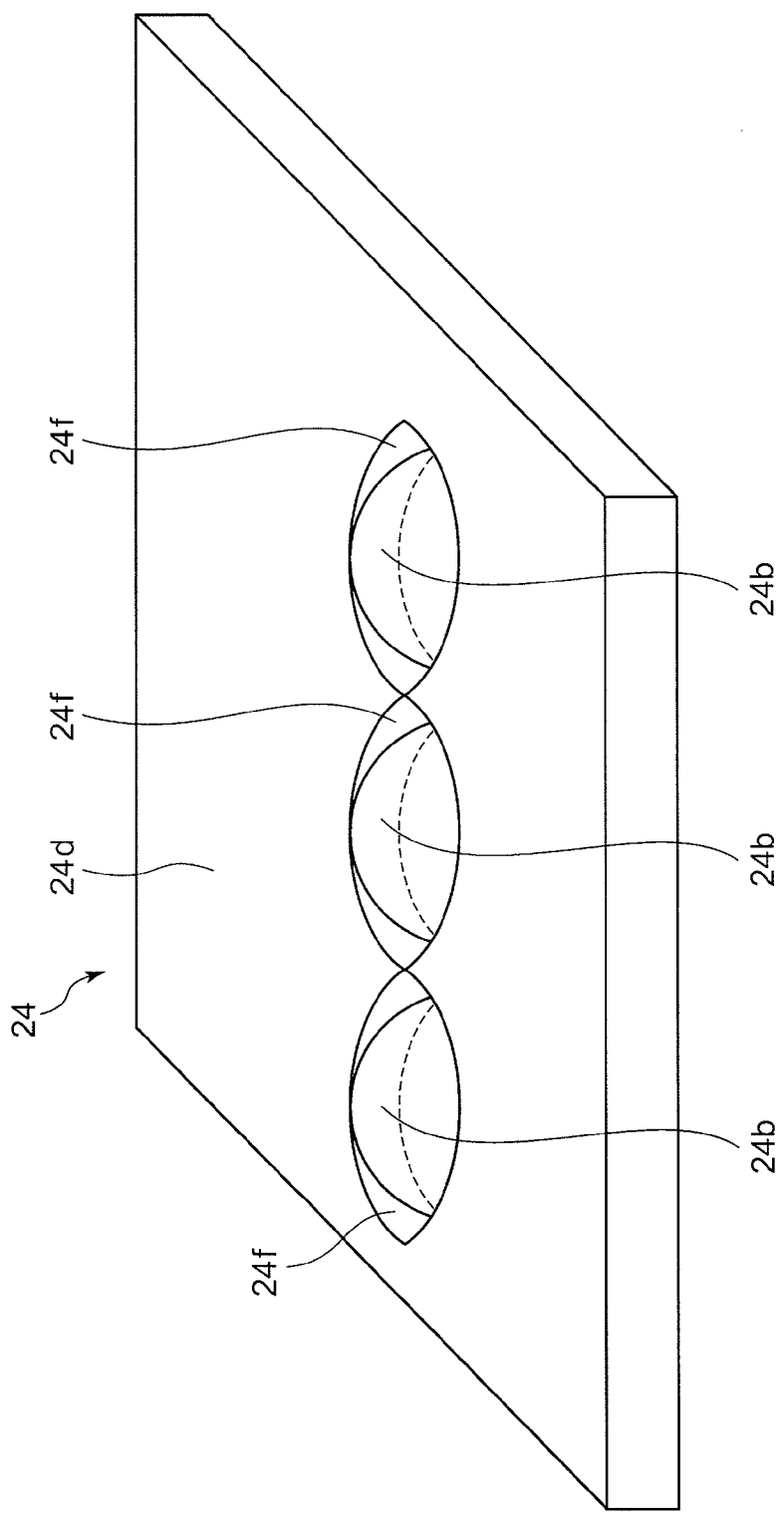
FIG. 6 is a perspective view of the second surface of the first lens array plate.

FIG. 6 is a perspective view of the second surface 24d of the first lens array plate 24. As shown in FIGS. 2, 3, 5, and 6, an annular slope 24f is formed on the second surface 24d of the first lens array plate 24 to surround each second lens 24b. Each slope 24f is formed to radially extend from the outer periphery of each second lens 24b in a tapered shape. The shape of the slope 24f can be expresses as a mortar. The angle of the slope 24f is defined to totally reflect light incident on the slope.

The slope 24f is formed by providing a mortar-shaped hole in the second surface 24d. The second lens 24b is provided at the center of the mortar-shaped hole. As shown in FIGS. 5 and 6, the adjacent slopes 24f are in contact with each other at the upper peripheries thereof. Thus, FIG. 2, which shows a section of the optical scanning unit 10 in the main scanning direction, shows that a triangular convex portion is formed between adjacent second lenses 24b.

In further accordance with the embodiment, the top of the second lens 24b and the upper end of the slope 24f are at the same height. In other words, it is ensured that the sag of the second lens 24b is equal to the height of the slope 24f. The slope 24f is formed with the same material as that of the second lens 24b and integrated with the second lens 24b.

Basically, the second lens array plate 26 has the same structure as the first lens array plate 24. As in the second surface 24d of the first lens array plate 24, the plurality of third lenses 26a having a lens diameter D are arranged on the third surface 26c of the second lens array plate 26 at a lens pitch P. As in the second surface 24d of the first lens array plate 24, an annular slope 26f is formed on the third surface 26c to surround each third lens 26a. As in the first surface 24c of the first lens array plate 24, the plurality of fourth lenses 26b having a lens diameter D are arranged on the fourth surface 26d of the second lens array plate 26 at a lens pitch P. A flat part 26e not formed with a lens is provided between adjacent fourth lenses 26b. The third lens 26a and the fourth lens 26b may have different lens diameters. It is desirable that the first lens 24a and the fourth lens 26b have the same lens diameter and the second lens 24b and the third lens 26a have the same lens diameter.

The first lens array plate 24 and the second lens array plate 26 form a stack such that the second surface 24d and the third surface 26c face each other to ensure that a combination of the first lens 24a, the second lens 24b, the third lens 26a, and the fourth lens 26b associated with each other form a coaxial lens system. According to the embodiment the first lens array plate 24 and the second lens array plate 26 form a stack such that the top of the second lens 24b and that of the third lens 26a are in contact with each other. As described above, the top of the second lens 24b and the third lens 26a is at the same height as the upper end of the slopes 24f and 26f, respectively. Thus, the upper end of the slope 24f and that of the slope 26f are in contact with each other as shown in FIG. 2. In the following description, the combination of the first lens 24a, the second lens 24b, and third lens 26a, and the fourth lens 26b associated with each other are dealt as one lens system. The light axes of the lenses belonging to a given lens system are aligned. The slopes 24f and 26f formed around the second lens 24b and the third lens 26a, respectively, are also included in the lens system.

As described above, the first lens array plate 24 and the second lens array plate 26 are held by a holder 30 in a stacked state. As shown in FIG. 1, the holder 30 is formed as a hollow quadrangular prism. The first lens array plate 24 and the second lens array plate 26 are inserted therein. Alternatively, the hollow quadrangular prism may be divided into two parts so that the two parts accommodate the first lens array plate 24 and the second lens array plate 26, respectively. A plurality of first through holes 30c aligned with the plurality of first lenses 24a are formed in the first surface part 30a of the holder 30. A plurality of second through holes 30d aligned with the plurality of fourth lenses 26b are formed in the second surface part 30b of the holder 30 opposite to the first surface part 30a. The first through holes 30c and the second through holes 30d are cylindrical through holes.

The first through holes 30c and the second through holes 30d have the same shape and are arranged in a line at the same pitch in the longitudinal direction of the first surface part 30a and the second surface part 30b, respectively. The central axes of the corresponding two through holes are aligned. The diameter of each of the first through holes 30c and the second through holes 30d is configured to be substantially the same as or slightly smaller than the diameter D of the first lenses 24a and the fourth lenses 26b. The pitch of arrangement of the first through holes 30c and the second through holes 30d is identical to the lens pitch P of the first lenses 24a and the fourth lenses 26b.

The first surface part 30a and the second surface part 30b of the holder 30 are formed as one piece using a light shielding material. The assembly may be formed by, for example, injection molding. Preferably, the shielding material is amenable to injection molding and is highly capable of shielding light in a required wavelength band. For example, the shielding material may be a black ABS resin.

In a state where the first lens array plate 24 is inserted into the holder 30, the first through holes 30c of the first surface part 30a directly face the respective first lenses 24a. According to the embodiment, the first lenses 24a are laid in the respective first through holes 30c. Further, in a state where the second lens array plate 26 is inserted into the holder 30, the second through holes 30d of the second surface part 30b directly face the respective fourth lenses 26b. According to the embodiment, the fourth lenses 26b are laid in the respective second through holes 30d of the second surface part 30b.

By producing the assembly as described above, the area on the first surface 24c of the first lens array plate 24 outside the first lenses 24a is covered by the first surface part 30a of the holder 30. Further, the area on the fourth surface 26d of the second lens array plate 26 outside the fourth lenses 26b is covered by the second surface part 30b of the holder 30.

The first surface part 30a and the second surface part 30b of the holder 30 are formed by using a light shielding material. Accordingly, the portion of the first surface part 30a surrounding the first lens 24a functions as a first light shielding wall 30e that prevents stray light from being incident on the first lens 24a. The portion of the second surface part 30b surrounding the fourth lens 26b functions as a second light shielding wall 30f that prevents stray light from being incident from the fourth lens 26b.

By adjusting the thickness of the first surface part 30a and the second surface part 30b of the holder 30, the height of the first light shielding wall 30e and the second light shielding wall 30f can be changed. The height of the first light shielding wall 30e and the second light shielding wall 30f is desirably set to remove light entering at an angle larger than a predetermined maximum angle of view.

The erecting equal-magnification lens array plate 11 as configured above is built in the image reading device 100 such that the distance from the first lens 24a to the document G and the distance from the fourth lens 26b to the line image sensor 20 are equal to a predetermined working distance WD.

Figure 7:
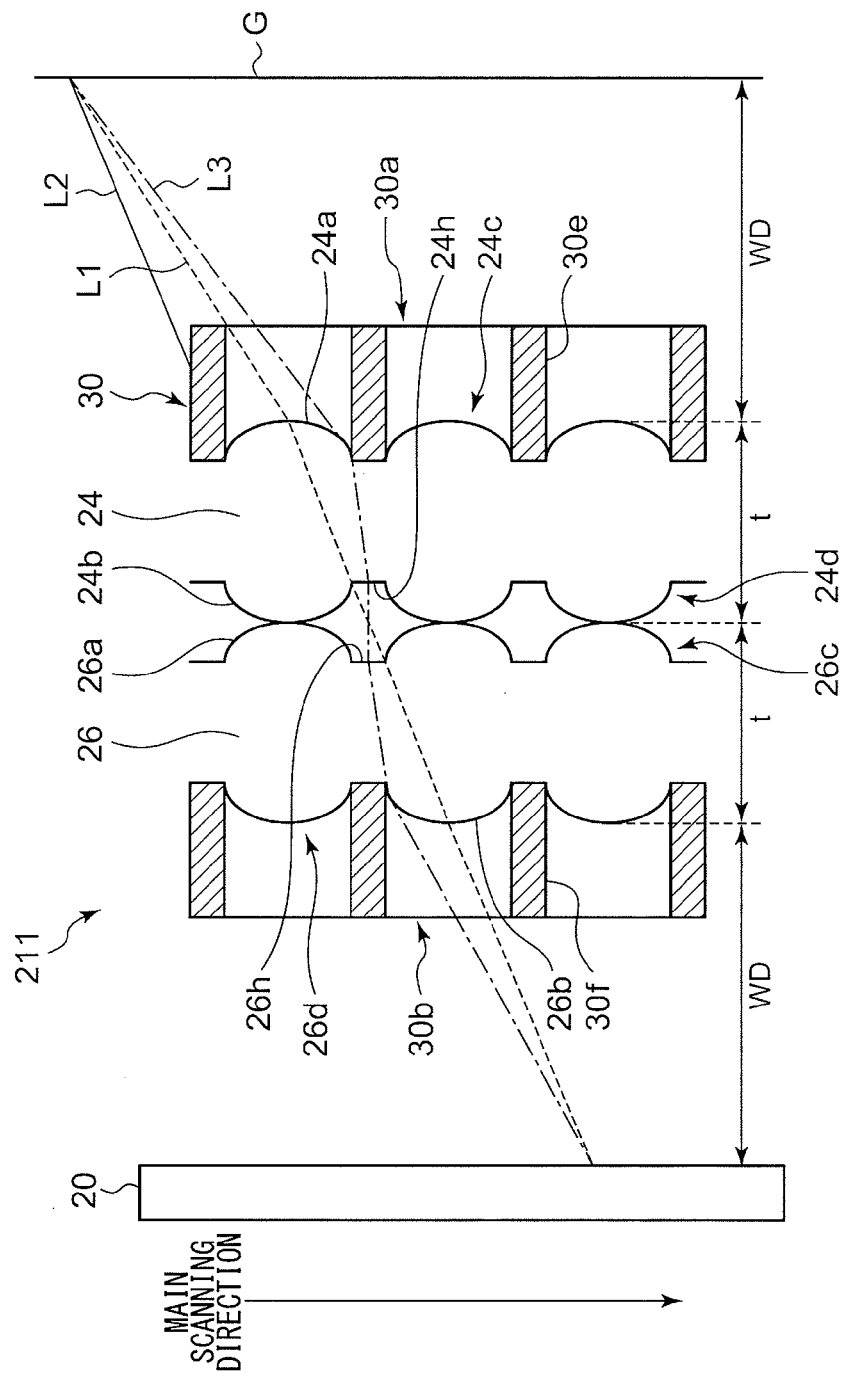
FIG. 7 shows an erecting equal-magnification lens array plate according to a comparative example.

A description will now be given of elimination of ghost noise using the erecting equal-magnification lens array plate 11 according to the embodiment. Before describing the erecting equal-magnification lens array plate 11, a comparative example will be shown. FIG. 7 shows an erecting equal-magnification lens array plate 211 according to the comparative example. In the erecting equal-magnification lens array plate 211 according to the comparative example, no slopes are formed around the second lenses 24b and the third lenses 26a. Therefore, between adjacent second lenses 24b and between adjacent third lenses 26a are located flat parts 24h and 26h, respectively. The other aspects of the erecting equal-magnification lens array plate 211 are identical to those of the erecting equal-magnification lens array plate 11 according to the embodiment.

It will be assumed that a light beam diagonally enters one of the first lenses 24a from the document G. As shown in FIG. 7, the light beam traveling toward the lens center of the first lens 24a from a given point on the document G will be referred to as primary light beam L1 (dotted line), the light beam traveling toward the nearer edge of the first lens 24a will be denoted by L2 (solid line), and the light beam traveling toward the farther edge of the first lens 24a will be denoted by L3 (dashed line).

As shown in FIG. 7, the light beam L2 is removed by the first light shielding wall 30e. Meanwhile, the primary light beam L1 and the light beam L3 are incident on the first lens 24a, travel past the flat part 24h of the second surface 24d and the flat part 26h of the third surface 26c, respectively, before exiting from the fourth lens 26b of the lens system adjacent to the lens system on which the beam is incident. The light exiting from the fourth lens 26b is not removed by the second light shielding wall 30f and is incident on the line image sensor 20, creating ghost noise.

Figure 8:
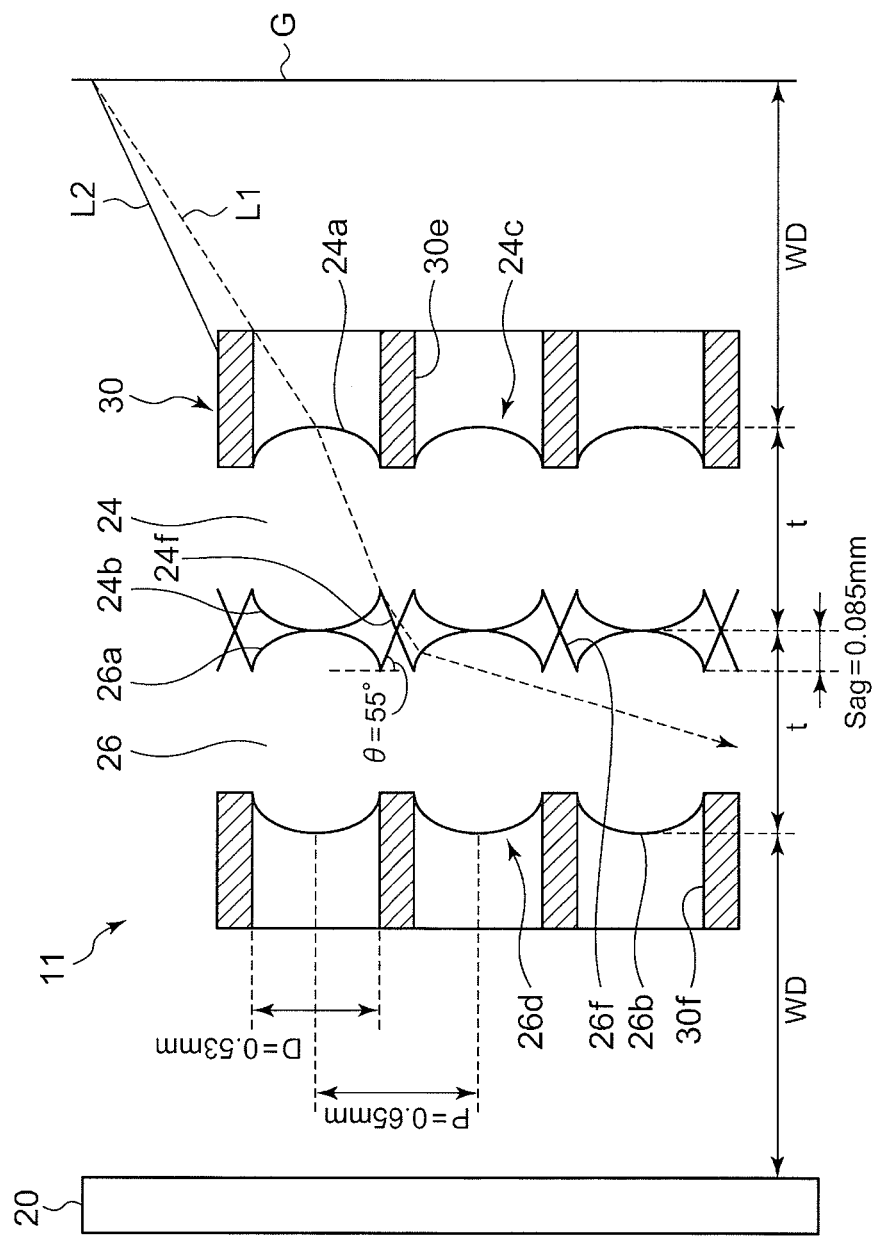
FIG. 8 shows, by way of one example, how ghost noise is eliminated by the erecting equal-magnification lens array plate according to the embodiment.

FIG. 8 shows, by way of one example, how ghost noise is eliminated by the erecting equal-magnification lens array plate 11 according to the embodiment. As in the case of the comparative example of FIG. 7, it will be assumed that a light beam diagonally enters one of the first lenses 24a of the erecting equal-magnification lens array plate 11 from the document G. The light beam traveling toward the lens center of the first lens 24a from a given point on the document G will be referred to as primary light beam L1 (dotted line), and the light beam traveling toward the nearer edge of the first lens 24a will be denoted by L2 (solid line). The light beam L3 traveling toward the farther edge of the first lens 24a will be discussed with reference to FIG. 9 in order to illustrate the light path of the beam more clearly.

In this example, the lens pitch P=0.65 mm, the lens diameter D=0.53 mm, and the lens sag=0.085 mm. The sag of the lens is equal to the height of the slope. In this case, if the slopes 24f and 26f are formed such that adjacent slopes 24f are in contact with each other and adjacent slopes 26f are in contact with each other, the angle θ of the slopes 24f and 26f will be 55°. The angle θ of the slope is defined with respect to a plane perpendicular to the optical axis Ax of the erecting equal-magnification lens array plate 11.

As shown in FIG. 8, the light beam L2 is removed by the first light shielding wall 30e. The primary light beam L1 is incident on the first lens 24a. The primary light beam L1 is totally reflected by the slope 24f formed around the second lens 24b of the lens system on which the beam is incident. The totally reflected primary light beam L1 exits the slope 24f belonging to the adjacent lens system before being incident on the second lens array plate 26. The primary light beam L1 is refracted by the third lens 26a on the third surface 26c before being removed by the second light shielding wall 30f. Therefore, the primary light beam L1 is not incident on the line image sensor 20 and does not create ghost noise.

Figure 9:
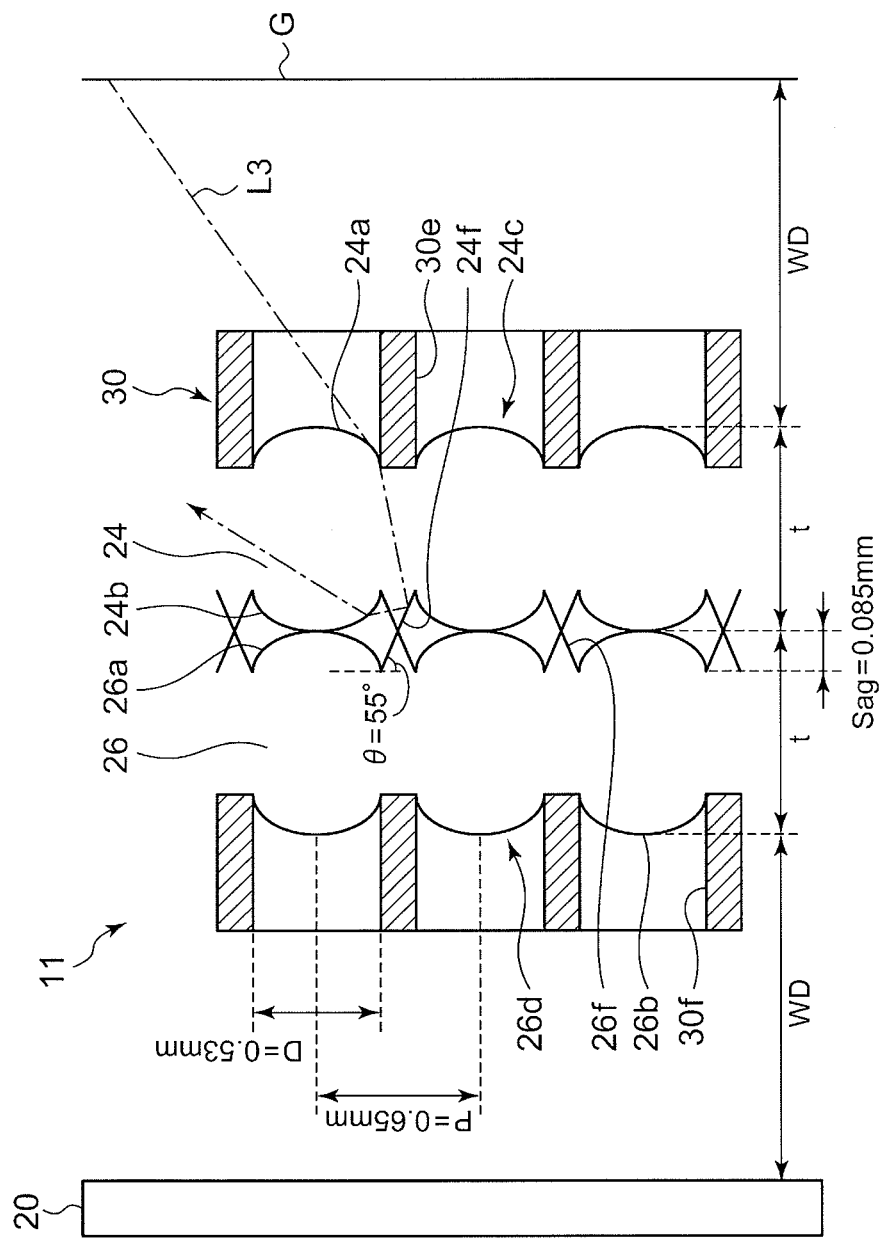
FIG. 9 shows, by way of another example, how ghost noise is eliminated by the erecting equal-magnification lens array plate according to the embodiment.

FIG. 9 shows a light path of the light beam L3 (dashed line) traveling from a given point on the document G toward the farther edge of the first lens 24a under the same condition as that of FIG. 8.

The light beam L3 incident on the first lens 24a is totally reflected by the slope 24f belonging to the lens system adjacent to the lens system on which the beam is incident. The totally reflected light beam L3 is refracted by the second lens 24b of the lens system on which the beam is incident before being removed by the first light shielding wall 30e. Therefore, the light beam L3 is not incident on the line image sensor 20 and does not create ghost noise.

Figure 10:
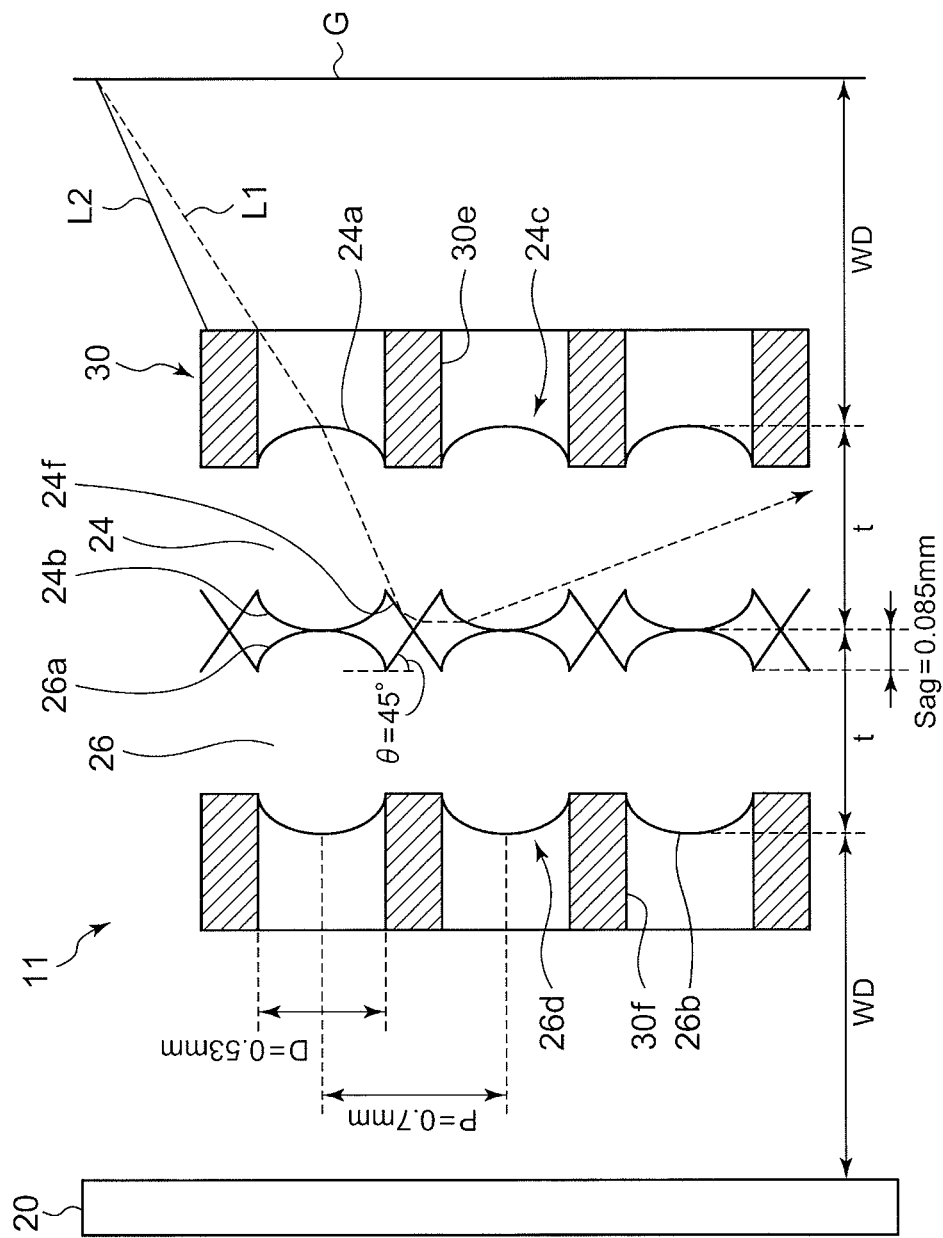
FIG. 10 shows, by way of still another example, how ghost noise is eliminated by the erecting equal-magnification lens array plate according to the embodiment.

FIG. 10 shows, by way of another example, how ghost noise is eliminated by the erecting equal-magnification lens array plate 11 according to the embodiment. In the example of FIG. 10, the lens pitch P=0.7 mm, the lens diameter D=0.53 mm, and the lens sag=0.085 mm. The sag of the lens is equal to the height of the slope. In this case, if the slopes 24f and 26f are formed such that adjacent slopes 24f are in contact with each other and adjacent slopes 26f are in contact with each other, the angle θ of the slopes 24f and 26f will be 45°. The paths of the primary light beam L1 (dotted line) and the light beam L2 (solid line) will be discussed in this example, too. The light beam L3 will be discussed with reference to FIG. 11.

As shown in FIG. 10, the light beam L2 is removed by the first light shielding wall 30e. The primary light beam L1 is incident on the first lens 24a. The primary light beam L1 is totally reflected by the slope 24f of the lens system on which the beam is incident. In this example, the totally reflected primary light beam L1 exits the slope 24f belonging to the adjacent lens system before being incident on the second lens 24b of the adjacent lens system. The primary light beam L1 is refracted by the second lens 24b before being removed by the first light shielding wall 30e. Therefore, the primary light beam L1 is not incident on the line image sensor 20 and does not create ghost noise in this example as in the above example.

Figure 11:
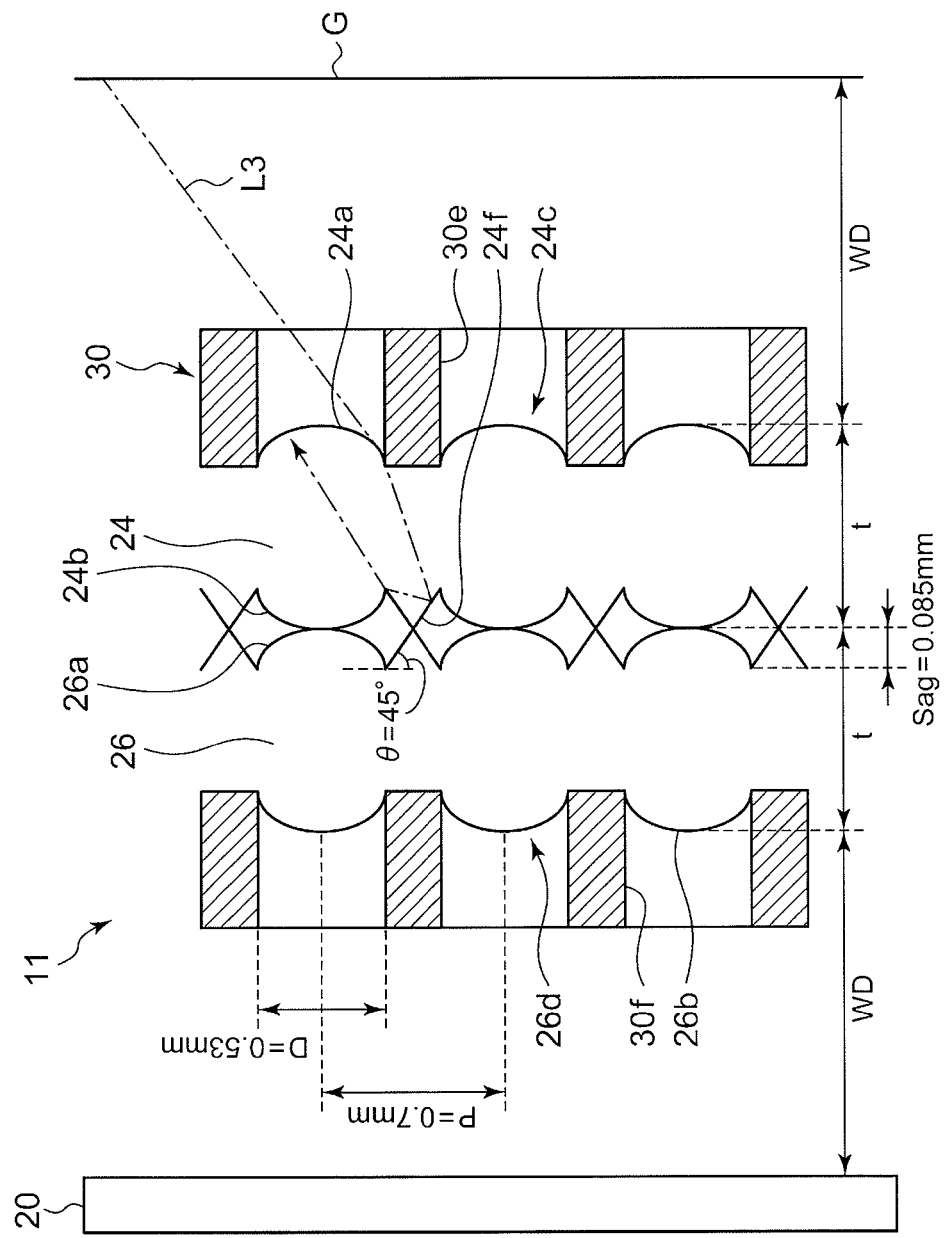
FIG. 11 shows, by way of yet another example, how ghost noise is eliminated by the erecting equal-magnification lens array plate according to the embodiment.

FIG. 11 shows the light path of the light beam L3 occurring under the same condition as that of FIG. 10. The light beam L3 incident on the first lens 24a is totally reflected by the slope 24f belonging to the lens system adjacent to the lens system on which the beam is incident. The totally reflected light beam L3 is refracted by the second lens 24b of the lens system on which the beam is incident before being removed by the first light shielding wall 30e. Therefore, the light beam L3 is not incident on the line image sensor 20 and does not create ghost noise.

Figure 12:
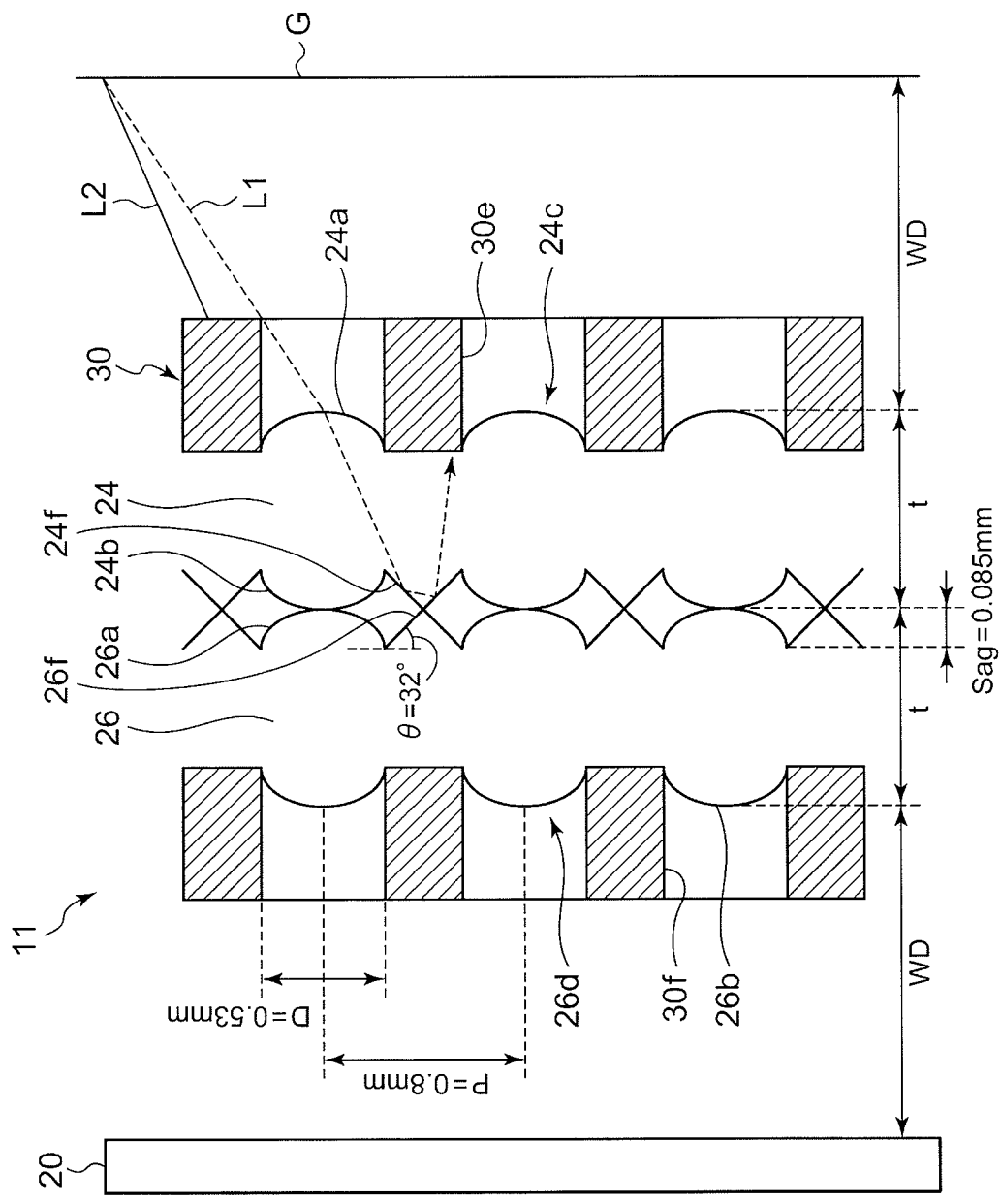
FIG. 12 shows, by way of still another example, how ghost noise is eliminated by the erecting equal-magnification lens array plate according to the embodiment.

FIG. 12 shows, by way of still another example, how ghost noise is eliminated by the erecting equal-magnification lens array plate 11 according to the embodiment. In the example of FIG. 12, the lens pitch P=0.8 mm, the lens diameter D=0.53 mm, and the lens sag=0.085 mm. The sag of the lens is equal to the height of the slope. In this case, if the slopes 24f and 26f are formed such that adjacent slopes 24f are in contact with each other and adjacent slopes 26f are in contact with each other, the angle θ of the slopes 24f and 26f will be 32°. The paths of the primary light beam L1 (dotted line) and the light beam L2 (solid line) will be discussed in this example, too.

As shown in FIG. 12, the light beam L2 is removed by the first light shielding wall 30e. The primary light beam L1 is incident on the first lens 24a. The primary light beam L1 is totally reflected by the slope 24f belonging to the lens system on which the beam is incident. In this example, the totally reflected primary light beam L1 is totally reflected by the slope 24f belonging to the next lens system again. The primary light beam L1 totally reflected twice is removed by the first light shielding wall 30e. Therefore, the primary light beam L1 is not incident on the line image sensor 20 and does not create ghost noise in this example as in the above example. Under the condition of FIG. 12, no beams are incident on the first lens 24a and then incident on the slope 24f of the immediately adjacent lens system.

Figure 13:
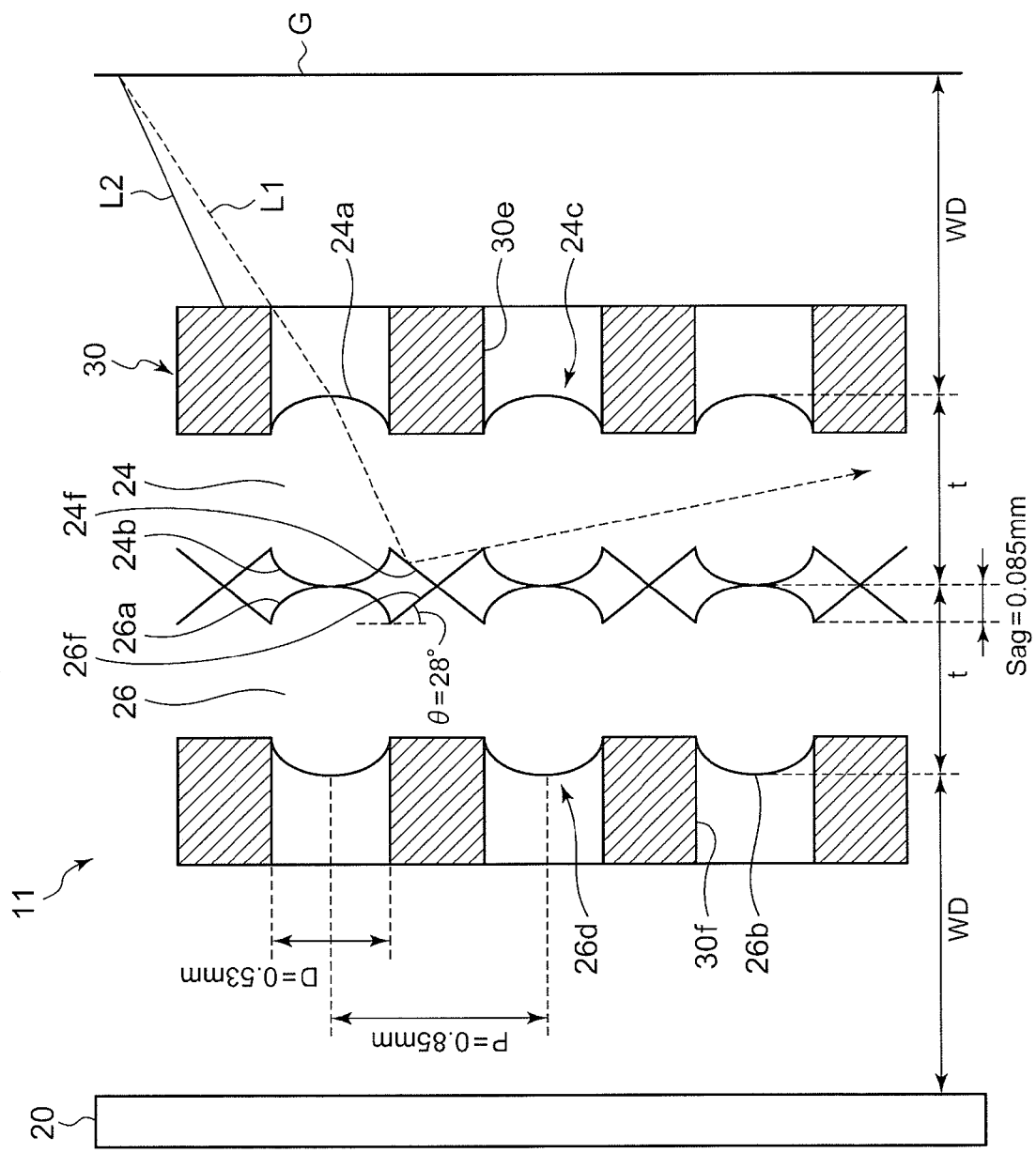
FIG. 13 shows, by way of yet another example, how ghost noise is eliminated by the erecting equal-magnification lens array plate according to the embodiment.

FIG. 13 shows, by way of yet another example, how ghost noise is eliminated by the erecting equal-magnification lens array plate 11 according to the embodiment. In the example of FIG. 13, the lens pitch P=0.85 mm, the lens diameter D=0.53 mm, and the lens sag=0.085 mm. The sag of the lens is equal to the height of the slope. In this case, if the slopes 24f and 26f are formed such that adjacent slopes 24f are in contact with each other and adjacent slopes 26f are in contact with each other, the angle θ of the slopes 24f and 26f will be 28°. The paths of the primary light beam L1 (dotted line) and the light beam L2 (solid line) will be discussed in this example, too.

As shown in FIG. 13, the light beam L2 is removed by the first light shielding wall 30e. The primary light beam L1 is incident on the first lens 24a. The primary light beam L1 is totally reflected by the slope 24f of the lens system on which the beam is incident. In this example, the totally reflected primary light beam L1 is not incident on the other slope 24f and removed by the first light shielding wall 30e. Therefore, the primary light beam L1 is not incident on the line image sensor 20 and does not create ghost noise in this example as in the above example. Under the condition of FIG. 13, no beams are incident on the first lens 24a and then incident on the slope 24f of the immediately adjacent lens system.

Figure 14:
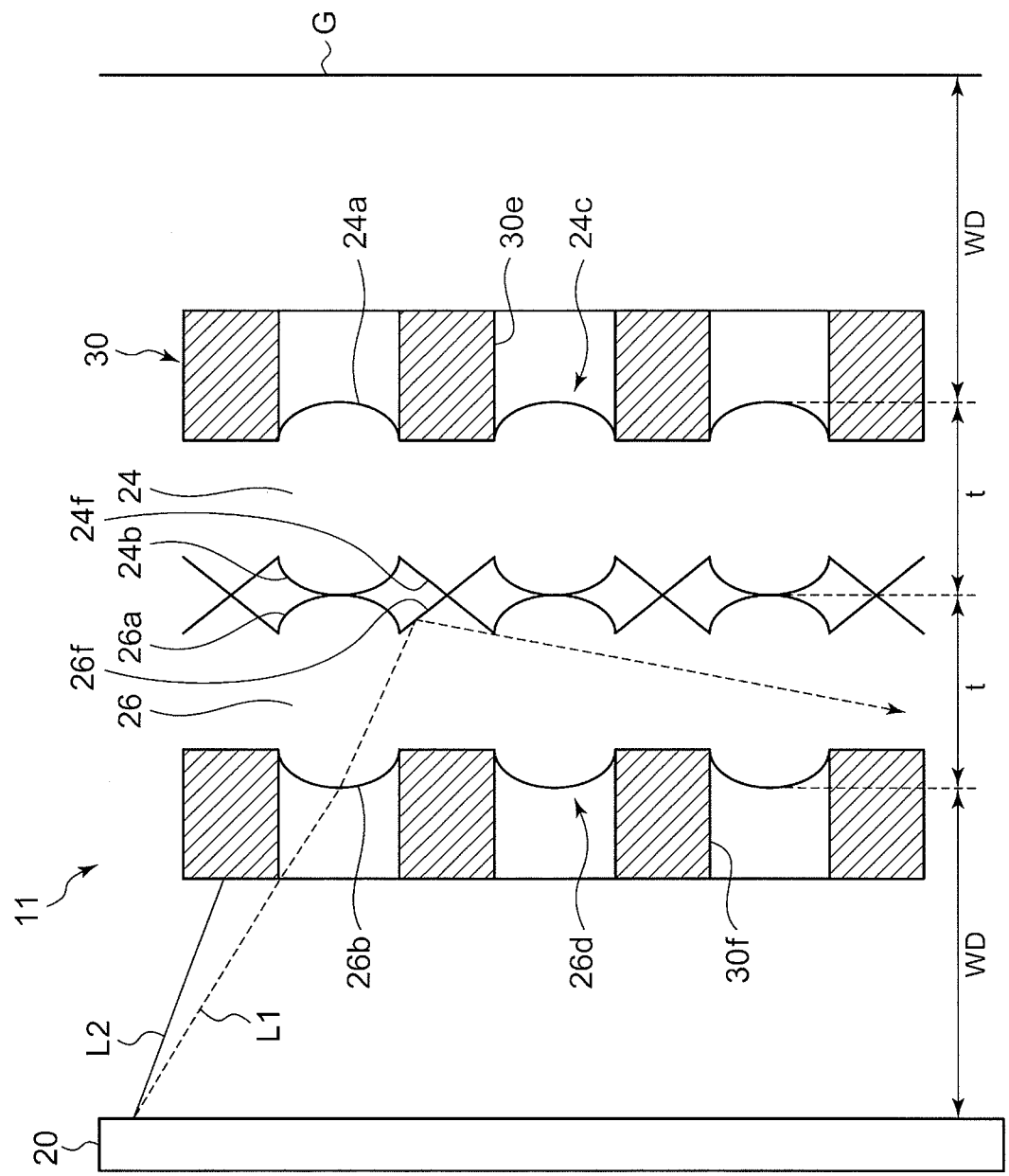
FIG. 14 shows, by way of still another example, how ghost noise is eliminated by the erecting equal-magnification lens array plate according to the embodiment.

FIG. 14 shows, by way of still another example, how ghost noise is eliminated by the erecting equal-magnification lens array plate 11 according to the embodiment. FIG. 14 shows a light path occurring on the assumption that a beam exits the line image sensor 20. As shown in FIG. 14, the light beam traveling toward the lens center of the fourth lens 26b will be referred to as primary light beam L1 (dotted line), and the light beam traveling toward one of the edges of the fourth lens 26b will be denoted by L2 (solid line). The conditions such as lens pitch are the same as those of FIG. 13.

As shown in FIG. 14, the light beam L2 is removed by the second light shielding wall 30f. The primary light beam L1 is incident on the fourth lens 26b. The primary light beam L1 is totally reflected by the slope 26f of the lens system on which the beam is incident. In this example, the totally reflected primary light beam L1 is not incident on the other slope 26f and removed by the second light shielding wall 30f.

As described above, the light beam exiting from the line image sensor 20 does not reach the document G. Since the erecting equal-magnification lens array plate 11 according to the embodiment is a symmetrical optical system, this means that there are no paths for beams from the document G to the line image sensor 20. This is explained by the principle of reversibility of light-path.

As described above with reference to FIGS. 8-14, at least a part of the beams diagonally incident on the first lens array plate 24 from the document G is totally reflected by the slopes 24f and 26f of the erecting equal-magnification lens array plate 11 according to the embodiment. The totally reflected primary light beam is removed by the first light shielding wall 30e or the second light shielding wall 30f. As a result, ghost noise is reduced more successfully than in the comparative example shown in FIG. 7 so that an erect equal-magnification image with higher quality can be formed.

An attempt to remove the diagonally incident beam in the comparative example of FIG. 7 will require providing a light shielding member that covers the flat part 24h of the second surface 24d and the flat part 26h of the third surface 26c. The erecting equal-magnification lens array plate 11 of the embodiment does not require the light shielding members with the result that the number of components is reduced and the manufacturing cost is reduced.

In the above-described embodiment, the slopes 24f and 26f are formed in the second and third surfaces 24d and 26c, respectively. Alternatively, ghost noise can be reduced by forming a slope in one of the surfaces. However, formation of the slopes 24f and 26f in the second and third surfaces 24d and 26d, respectively, is favorable in that ghost noise is reduced most successfully.

In the embodiment described above, the slopes 24f and 26f are formed such that the height thereof is identical to the sag of the second and third lenses 24b and 26a, respectively. Alternatively, ghost noise can be suitably reduced by ensuring that the height of the slopes 24f and 26f is 80% of the sag of the second and third lenses 24b and 26a, respectively, or more.

Figure 15:
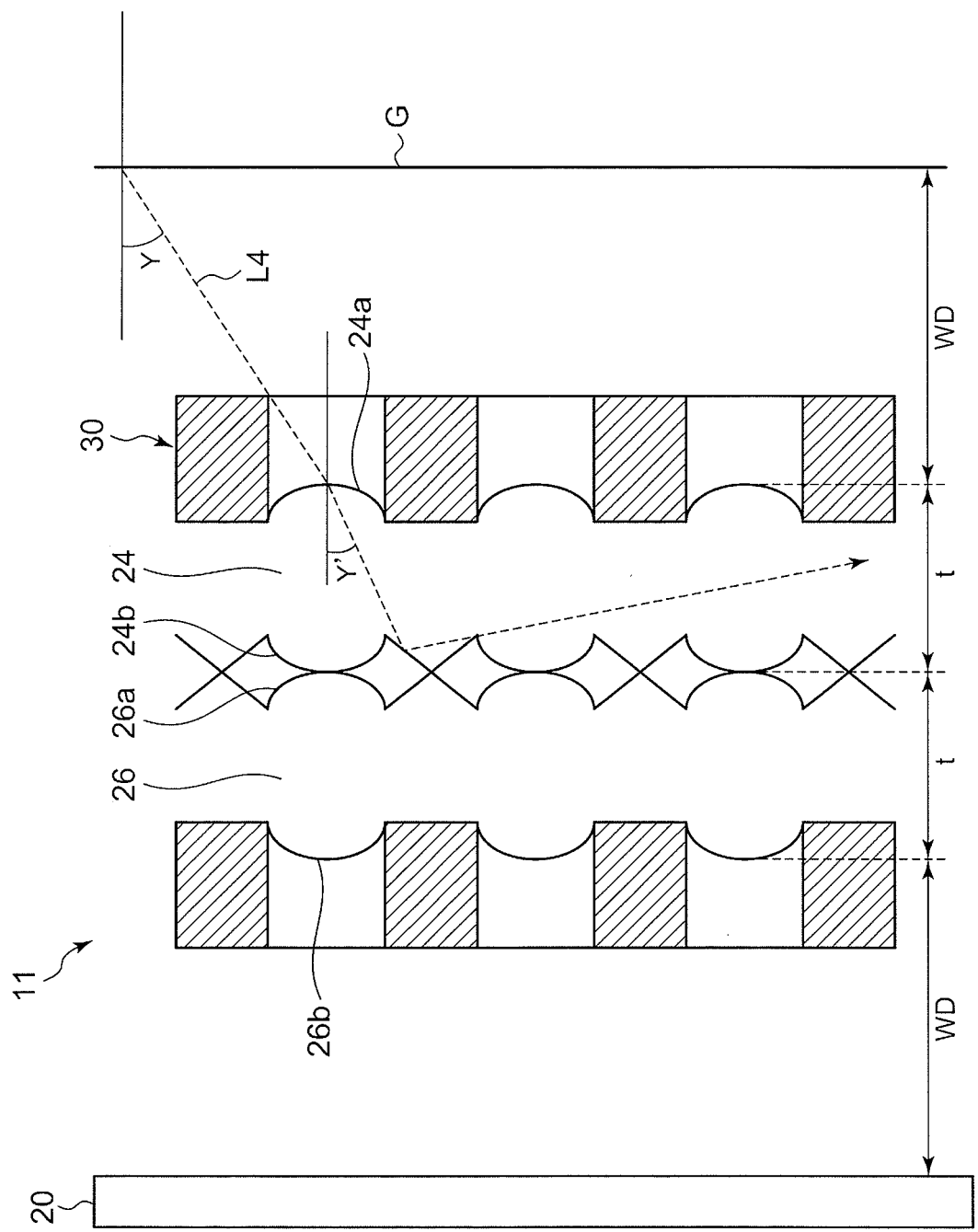
FIG. 15 shows a light path of a light beam incident on the erecting equal-magnification lens array plate at the maximum angle of incidence.

A description will now be given of the angle of slope necessary to create total reflection in the slope. FIG. 15 shows a light path of a light beam L4 incident on the erecting equal-magnification lens array plate 11 at the maximum angle of incidence Y. The light beam L4 is refracted when it is incident on the first lens 24a. The angle with respect to the optical axis of the lens is Y', which is smaller than the angle Y. Given that the refractive index of the first lens array plate 24 is n, the angle Y' is given by the expression (1) below.

$$Y'=Y/n \qquad (1)$$

Figure 16:
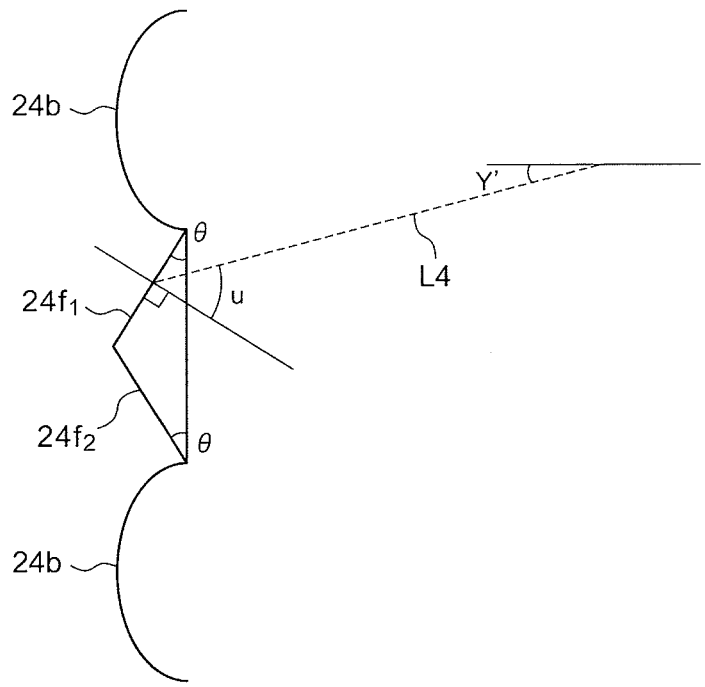
FIG. 16 shows that the light beam reaches a slope belonging to the lens system on which the beam is incident.
Figure 17:
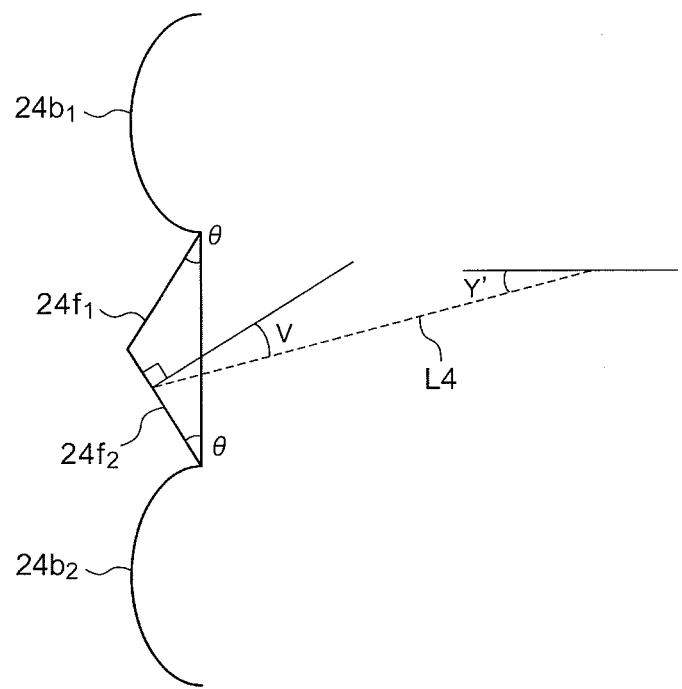
FIG. 17 shows that the light beam reaches a slope belonging to the lens system adjacent to the lens system on which the beam is incident.

There are two patterns of incidence of the light beam L4 on the slope. FIG. 16 shows that the light beam L4 reaches a slope 24f1 belonging to the lens system on which the beam is incident. FIG. 17 shows that the light beam L4 reaches a slope 24f2 belonging to the lens system adjacent to the lens system on which the beam is incident. Given that the angle of incidence on the slope 24f1 in the case of FIG. 16 is u, the angle of incidence on the slope 24f2 in the case of FIG. 17 is v, and the angle of slope is θ, the angles of incidence u and v are given by the expressions (2) and (3) below.

$$u=\theta+Y' \qquad (2)$$

$$v=\theta-Y' \qquad (3)$$

The condition in which the angles of incidence u and v are larger than the angle of total reflection is given by the expressions (4) and (5) below.

$$u=\theta+Y'>\arcsin(1/n) \qquad (4)$$

$$v=\theta-Y'>\arcsin(1/n) \qquad (5)$$

Modifying (4) and (5), we obtain the expressions (6) and (7) below showing the conditions for the angle θ of slope in which the light beam L4 is totally reflected by the slope.

$$\theta>\arcsin(1/n)-Y' \qquad (6)$$

$$\theta>\arcsin(1/n)+Y' \qquad (7)$$

Based on the expressions (6) and (7), it is known that the angle θ of slope should meet the expression (7) for total reflection to occur in both of the incidence patterns of FIGS. 16 and 17. However, as the angle θ of slope becomes smaller and the lens pitch becomes larger than a predetermined value, the light beam incident on a given lens system cannot enter the adjacent lens system. Accordingly, the case of FIG. 16 need only be considered to determine the minimum value of the angle θ of slope necessary for total reflection. Therefore, the necessary angle θ is determined by the expression (6).

Figures 18, 19:
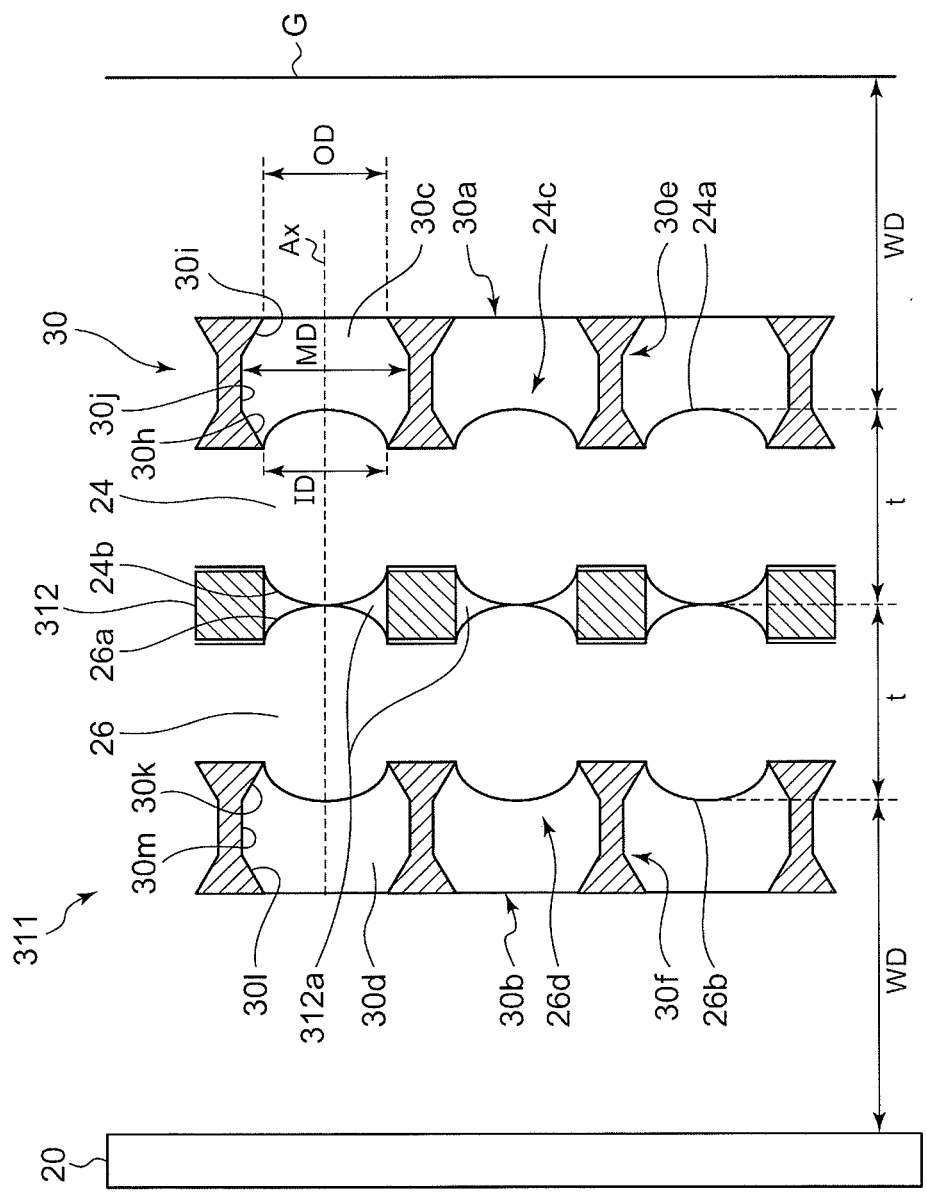
FIG. 18 shows a result of simulation of noise ratio performed in the erecting equal-magnification lens array plate shown in FIG. 2.
FIG. 19 shows an erecting equal-magnification lens array plate provided with a feature to eliminate flare noise.

An example of the erecting equal-magnification lens array plate 11 will be shown below. FIG. 18 shows a result of simulation of noise ratio performed in the erecting equal-magnification lens array plate 11 shown in FIG. 2. A ray tracing simulation was conducted. The entirety of the erecting equal-magnification lens array plate 11 is illuminated in the main scanning direction by a 90° Lambertian emission from a point light source. The amount of imaging light arriving at a specified point on the image plane is designated as the amount of imaging light transmitted. The amount of light arriving elsewhere is designated as the amount of light transmitted as noise. The illumination and measurement are conducted on a line extending in the main scanning direction. A noise ratio is defined as a sum of the amount of light transmitted as noise divided by the amount of imaging light transmitted. The ghost noise ratio and the flare noise ratio are determined separately. The total noise ratio is a sum of the ghost noise ratio and the flare noise ratio. Flare noise is created as the light beam reflected by the light shielding wall reaches the image plane.

The conditions of simulation are such that the lenses are arranged in a single row, the lens's working distance WD=3.3 mm, the plate thickness t of the first and second lens array plates is such that t=1.6 mm, the lens pitch P=0.65 mm, the lens diameter of the first and fourth lenses=0.47 mm, the lens diameter of the second and third lenses=0.53 mm, the refractive index n=1.53, the sag of the first and fourth lenses=0.07 mm, the sag of the second and third lenses=0.085 mm, the height h of the first and second light shielding walls is such that h=0.66 mm, the height of the light shielding wall-the sag=0.59 mm, the aperture of the first and second through holes=0.47 mm, the viewing field radius=0.92 mm, and the maximum angle of incidence=15.3°. The height of slope is equal to the sag of the second and third lenses and is 0.085 mm. Therefore, the angle θ of the slope is 55°. Incorporating the conditions for this simulation into the expression (7) above, we obtain θ>arcsin(1/1.53)+15.3/1.53=50.8°, demonstrating that the angle θ of slope calculated in the simulation meets the expression (7).

FIG. 18 also shows a result of simulation conducted in the erecting equal-magnification lens array plate according to comparative examples. The erecting equal-magnification lens array plate 211 according to comparative example 1 as shown in FIG. 7 is provided with a flat part 24h between adjacent second lenses 24b and with a flat part 26h between adjacent third lenses 26a. The erecting equal-magnification lens array plate according to comparative example 2 is provided with a light shielding member (not shown) to cover the flat parts 24h and 26h of the comparative example 1 of FIG. 7. The light shielding member according to comparative example 2 is sandwiched between the first lens array plate 24 and the second lens array plate 26. The light shielding member is provided with a plurality of third through holes in which the second lenses 24b and the third lenses 26a are laid. The aperture of the third through hole is 0.53 mm. The other conditions of simulation are identical to those of the embodiment.

The simulation reveals that the ghost noise ratio according to the embodiment is 0.00%. The ratio is significantly small compared with the ghost noise ratio=18.22% according to comparative example 1. This demonstrates that the embodiment provides satisfactory ghost noise reduction. It also shows that the embodiment provides substantially identical noise elimination performance in reference to the ghost noise ratio=0.00% according to comparative example 2 where a light shielding member is provided.

The simulation result shows that the slopes 24f and 26f formed around the second lenses 24b and the third lenses 26a, respectively, are effective to eliminate ghost noise but are not so effective to eliminate flare noise. Therefore, it is necessary to add an additional feature to eliminate flare noise. A description will now be given of an exemplary configuration to eliminate flare noise.

FIG. 19 shows an erecting equal-magnification lens array plate 311 provided with a feature to eliminate flare noise. In the erecting equal-magnification lens array plate 311 shown in FIG. 19, the shape of the first through hole 30c and the second through hole 30d in the first and second light shielding walls 30e and 30f, respectively, is different from that of the erecting equal-magnification lens array plate 11 shown in FIG. 2, etc. Further, a light shielding member 312 is provided between the first and second lens array plates 24 and 26 in the erecting equal-magnification lens array plate 311 in order to address ghost noise. The light shielding member 312 is provided with a plurality of third through holes 312a in which the second and third lenses 24b and 26a are laid.

As shown in FIG. 19, each first through hole 30c of the first light-shielding wall 30e is provided with a cylindrical lateral wall portion 30j provided upright so as to surround a space above the first lens 24a, an annular inner projection portion 30h provided at the end of the lateral wall portion 30j facing the first lens 24a, and an outer projection portion 30i provided at the end of the lateral wall portion 30j facing the document G. The inner projection portion 30h and the outer projection 30i are provided so as to project from the inner circumferential edge of the lateral wall portion 30j toward the center of the hole.

As shown in FIG. 19, an aperture having an aperture diameter ID (hereinafter, inner aperture diameter ID) is formed inside the inner projection portion 30h, and an aperture having an aperture diameter OD (hereinafter, referred to as outer aperture diameter OD) is formed inside the outer projection portion 30i. In the erecting equal-magnification lens array plate 311, the inner projection portion 30h and the outer projection portion 30i are formed such that the portions have the identical height. Therefore, given that the inner diameter of the lateral wall portion 30j is denoted by MD, the inner aperture diameter ID=the outer aperture diameter OD<the inner diameter MD.

The inner projection portion 30h and the outer projection portion 30i are formed such that there are no surfaces parallel to the optical axis Ax of the lens system. More specifically, the inner projection portion 30h is tapered such that the inner diameter is progressively larger from the edge facing the first lens 24a toward the center of the first through hole 30c in the direction of height. The outer projection portion 30i is tapered such that the inner diameter is progressively larger from the end facing the document G toward the center of the first through hole 30c in the direction of height.

As in the first light shielding wall 30e, each second through hole 30d of the second light-shielding wall 30f is provided with a cylindrical lateral wall portion 30m provided upright so as to surround a space above the fourth lens 26b, an annular inner projection portion 30k provided at the end of the lateral wall portion 30m facing the fourth lens 26b, and an outer projection portion 30l provided at the end of the lateral wall portion 30m facing the line image sensor 20. The inner projection portion 30k and the outer projection 30l are provided so as to project from the inner circumferential edge of the lateral wall portion 30m toward the center of the hole. The shapes of the lateral wall portion 30m, the inner projection unit 30k, and the outer projection portion 30l of the second through hole 30d are identical to those of the first through hole 30c so that a detailed description is omitted.

Figure 20:
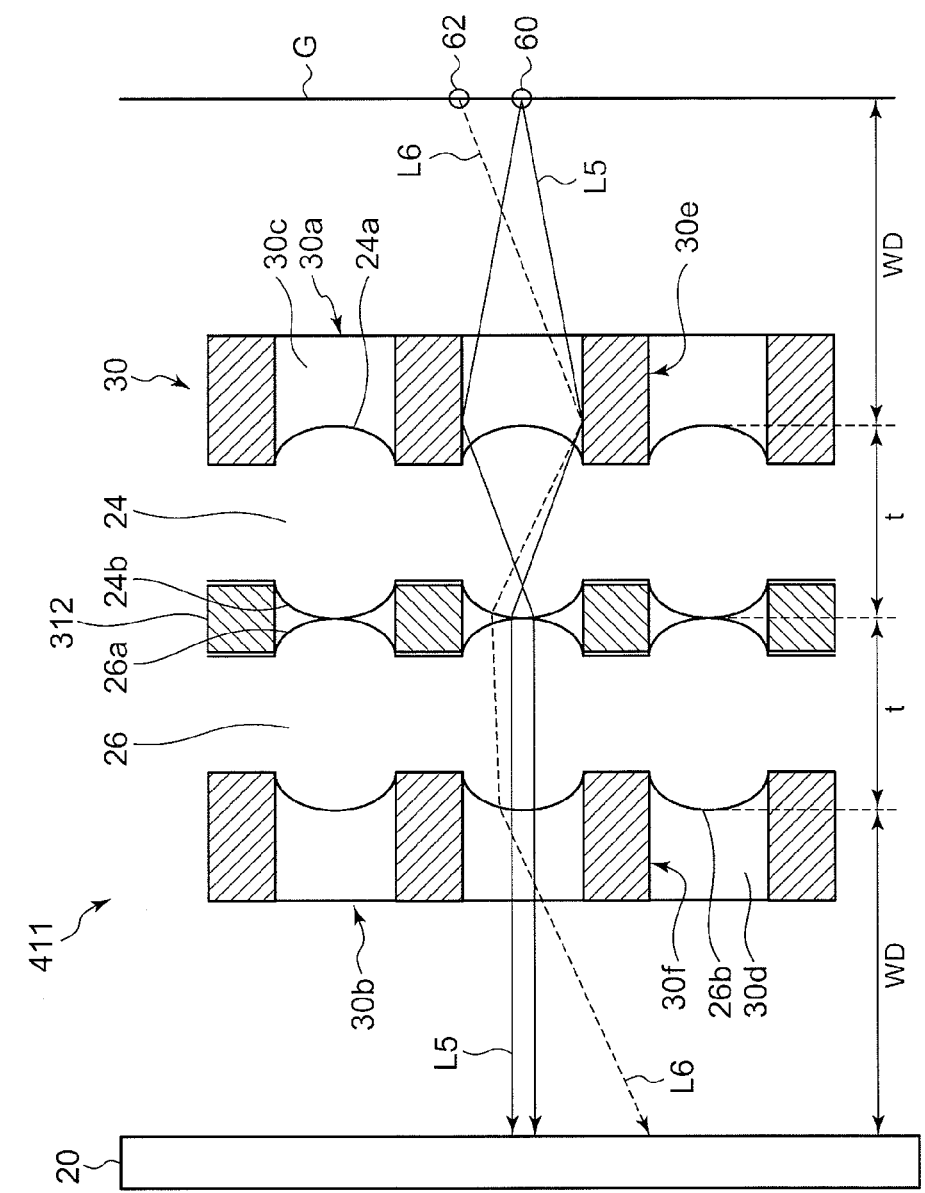
FIG. 20 shows how flare noise is produced in an erecting equal-magnification lens array plate according to the comparative example.

A description will now be given of flare noise elimination in the erecting equal-magnification lens array plate 311 according to the embodiment. Before describing the erecting equal-magnification lens array plate 311 of FIG. 19, a comparative example will be shown. FIG. 20 shows how flare noise is produced in an erecting equal-magnification lens array plate 411 according to the comparative example. In the erecting equal-magnification lens array plate 411 according to the comparative example, the first through holes 30c of the first light-shielding wall 30e and the second through holes 30d of the second light-shielding wall 30f are simply cylindrically formed. Inner projection portions or outer projection portions are not formed. In other words, the inner diameter of the first through holes 30c and the second through holes 30d in the erecting equal-magnification lens array plate 411 remains constant in the direction of height of the through holes.

First, a light beam L5 (solid line) emitted from a point 60 on the document G located on the optical axis of the first lens 24a will be discussed. Normally, the light beam L5 about to be incident on the first lens array plate 24 at an angle of incidence larger than an angle of the light to be imaged is absorbed by the lateral wall of the first through hole 30c of the first light shielding wall 30e. However, the light beam L5 is not completely absorbed even if a light absorbing material is used. The light beam L5 is partly incident on the first lens 24a due to Fresnel reflection. This is because, the Fresnel reflectance for an angle of incidence close to 90° of the light beam L5 incident on the lateral wall of the first through hole 30c is extremely large.

As shown in FIG. 20, the reflected light beam L5 is transmitted through the first lens 24a, the second lens 24b, the third lens 26a, and the fourth lens 26b before being incident on the line image sensor 20, causing flare noise.

Secondly, a light beam L6 (broken line) emitted from a point 62 on the document G outside the optical axis of the first lens 24a will be discussed. The light beam L6 is partly reflected by the lateral wall of the first through hole 30c by Fresnel reflection. As shown in FIG. 20, the reflected light beam L6 is transmitted through the first lens 24a, the second lens 24b, the third lens 26a, and the fourth lens 26b before being incident on the line image sensor 20, causing flare noise.

Flare noise produced by the reflection by the first light shielding wall 30e is described with reference to FIG. 20. Flare noise is also produced by the reflection by the second light shielding wall 30f.

Figure 21:
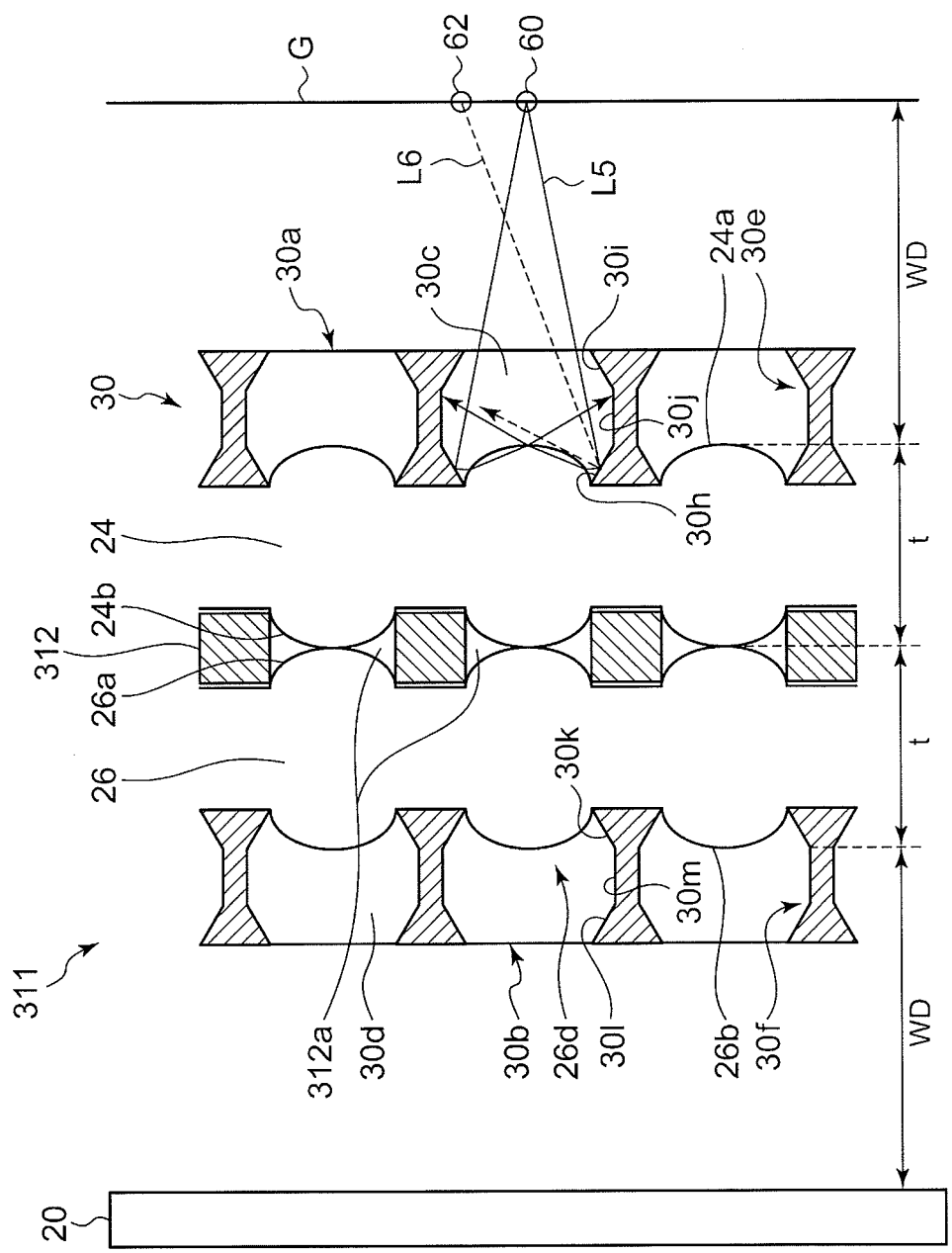
FIG. 21 shows flare noise elimination in the erecting equal-magnification lens array plate shown in FIG. 19.

FIG. 21 shows flare noise elimination in the erecting equal-magnification lens array plate 311 shown in FIG. 19. First, as in the case of the comparative example of FIG. 20, the light beam L5 (solid line) emitted from the point 60 on the document G located on the optical axis of the first lens 24a will be discussed. In erecting equal-magnification lens array plate 311, the light beam L5 is incident on the inner projection portion 30h of the first through hole 30c. Since the interior surface of the inner projection portion 30h is formed as a tapered surface inclined with respect to the optical axis, the light beam L5 reflected by the inner projection portion 30h is reflected multiple times in the first through hole 30c before being eliminated. Therefore, the light beam L5 does not reach the line image sensor 20 so that flare noise due to the light beam L5 is not produced. The same discussion applies to the light beam L6 (broken line) emitted from the point 62 outside the optical axis.

The action of reducing flare noise by the inner projection portion 30h of the first through hole 30c is described with reference to FIG. 21. Flare noise is similarly reduced by the inner projection portion 30k of the second through hole 30d. FIGS. 19 and 21 show that the inner projection portion and the outer projection portion are provided in both the first light shielding wall and the second light shielding wall. However, flare noise is suitably reduced by providing the inner projection portion and the outer projection portion in one of the first and second light shielding walls. Further, flare noise is suitably reduced by providing one of the inner and outer projection portions in the through holes.

Figures 22, 23:
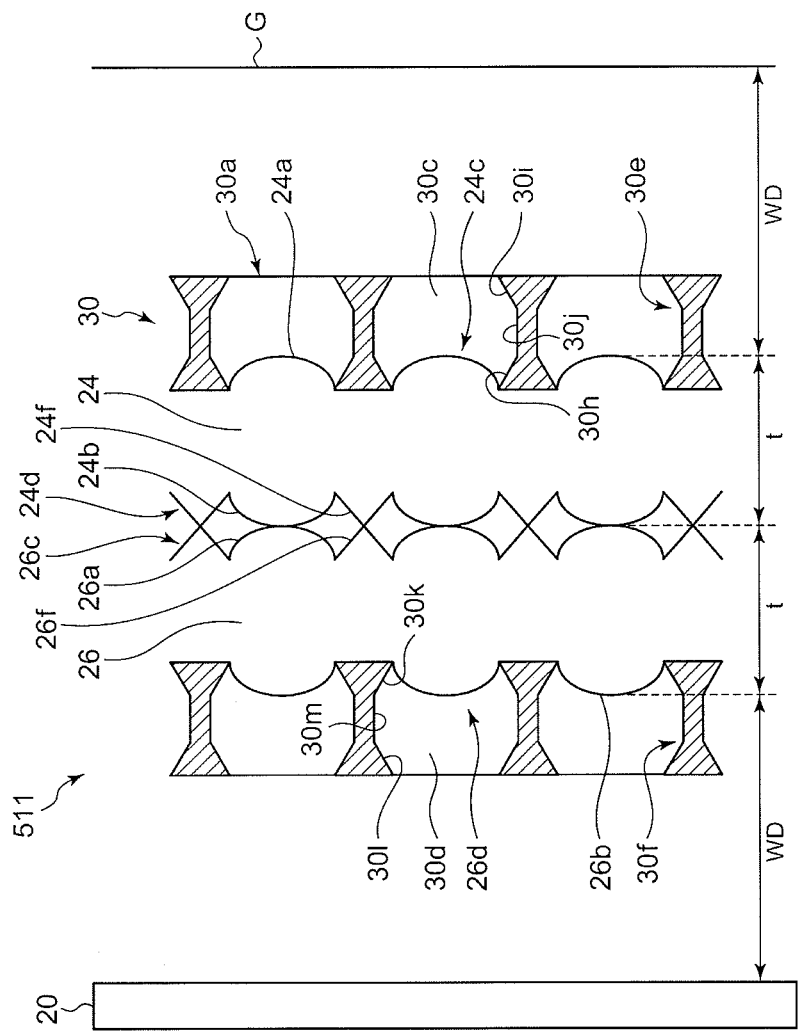
FIG. 22 shows an erecting equal-magnification lens array plate produced by providing the erecting equal-magnification lens array plate shown in FIG. 2 with a feature to eliminate flare noise.
FIG. 23 shows a result of simulation of noise ratio performed in the erecting equal-magnification lens array plate shown in FIG. 22.

FIG. 22 shows an erecting equal-magnification lens array plate 511 produced by providing the erecting equal-magnification lens array plate 11 shown in FIG. 2 with a feature to eliminate flare noise. In the erecting equal-magnification lens array plate 511 according to this embodiment, the lateral wall portion 30j, the inner projection portion 30h, and the outer projection portion 30i such as those of FIG. 19 are formed in the first through hole 30c of the first light shielding wall 30e of the holder 30. Further, the second through hole 30d of the second light shielding wall 30f of the holder 30 is formed with the lateral wall portion 30m, the inner projection unit 30k, and the outer projection portion 30l. Flare noise is reduced according to the structure as described above.

In further accordance with the erecting equal-magnification lens array plate 511, an annular slope 24f is formed on the second surface 24d of the first lens array plate 24 so as to surround each second lens 24b. Further, an annular slope 26f is formed on the third surface 26c of the second lens array plate 26 so as to surround each third lens 26a. The slopes 24f and 26f reduce ghost noise. Thus, the embodiment provides an erecting equal-magnification lens array plate capable of reducing ghost noise and flare noise.

A description will be given of an exemplary embodiment of the erecting equal-magnification lens array plate 511. FIG. 23 shows a result of simulation of noise ratio performed in the erecting equal-magnification lens array plate 511 shown in FIG. 22. As in the case of FIG. 18, the ghost noise ratio and the flare noise ratio are determined separately. A sum of the ghost noise ratio and the flare noise ratio represents the total noise ratio. The conditions of simulation are such that the inner diameter MD=0.6 mm, the inner aperture diameter ID=0.47 mm, the outer aperture diameter OD=0.47 mm, and the taper angle of the inner projection portion and the outer projection portion=45°. The other conditions are the same as those of FIG. 18.

FIG. 23 also shows a result of simulation conducted in the erecting equal-magnification lens array plate according to comparative examples. The erecting equal-magnification lens array plate 311 shown in FIG. 19 is defined as comparative example 4. The erecting equal-magnification lens array plate 311 shown in FIG. 19 with the light shielding member 312 removed is defined as comparative example 3.

The simulation reveals that the flare noise ratio according to the embodiment is 0.04%, which is significantly smaller than 45.15% indicated in FIG. 18. The ghost noise ratio is 0.00% as in the case of FIG. 18 so that the total ratio in the erecting equal-magnification lens array plate 511 is 0.04%, which is quite small. This shows that the erecting equal-magnification lens array plate 511 provides substantially identical noise elimination performance as comparative example 4 (total noise ratio=0.03%).

FIG. 24 shows a result of simulation of noise ratio performed in the erecting equal-magnification lens array plate 511 shown in FIG. 22 such that the angle of the slope is varied; The height of the slope is maintained constant (0.085 mm). The angle of slope is varied from 55° to 20° by varying the lent pitch from 0.65 mm to 1.00 mm. The simulation result shows that the ghost noise ratio remains unchanged even if the angle of slope is varied from 55° to 20°. However, the flare noise ratio tends to increase as the angle of slope is decreased. Therefore, the larger the angle of slope, the better.

Figure 25:
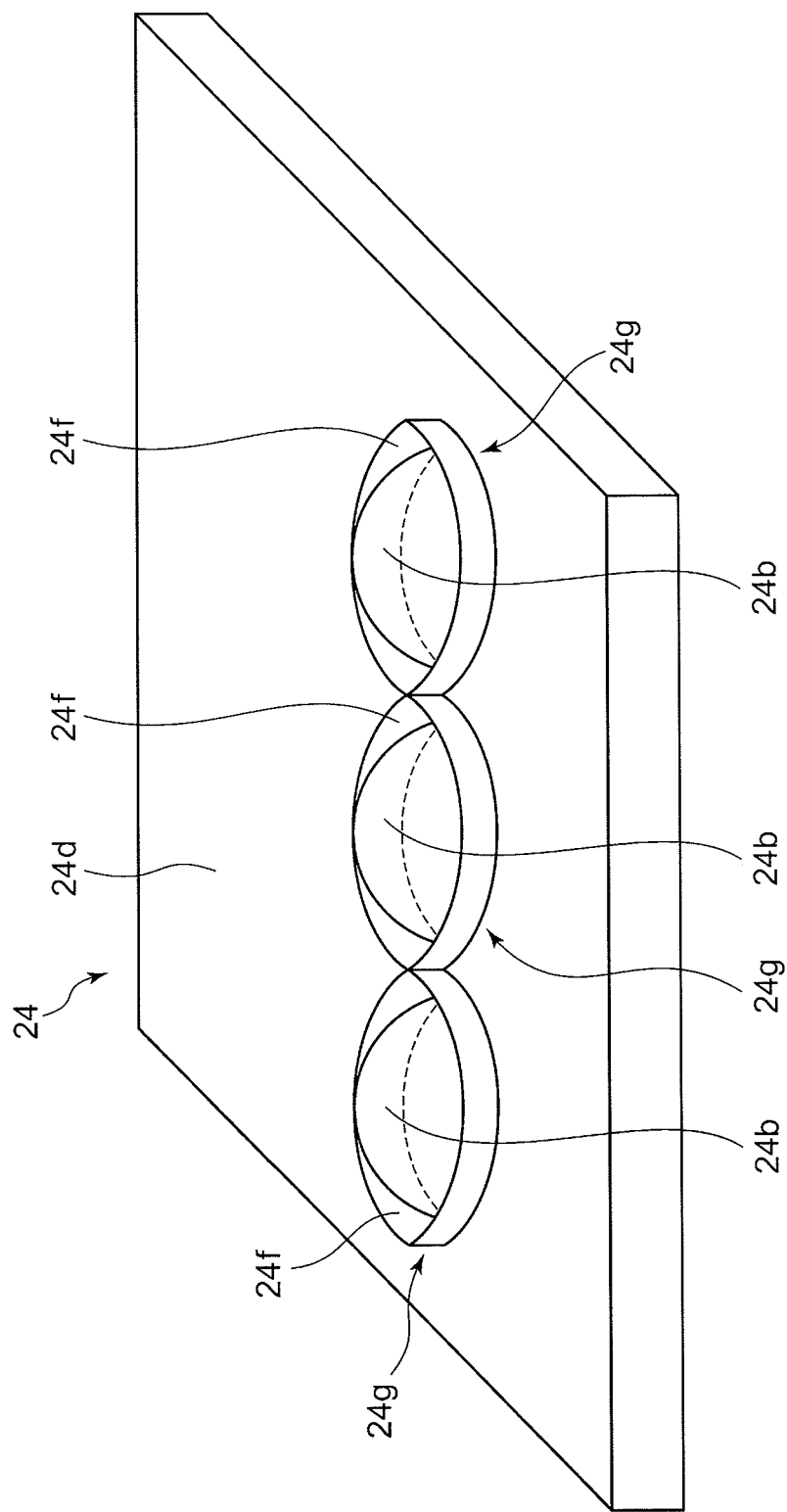
FIG. 25 shows a variation of embodiment concerning the slope portion.

FIG. 25 shows a variation of embodiment concerning the slope portion. FIG. 6 shows that the slope 24f is formed by providing the second surface 24d with a mortar-like hole. Meanwhile, in the embodiment shown in FIG. 25, the slope 24f is formed by providing an annular projection portion 24g on the second surface 24d. A mortar-like slope is formed inside the projection portion 24g. The slope configured according to this example will also eliminate ghost noise suitably.

Figure 26:
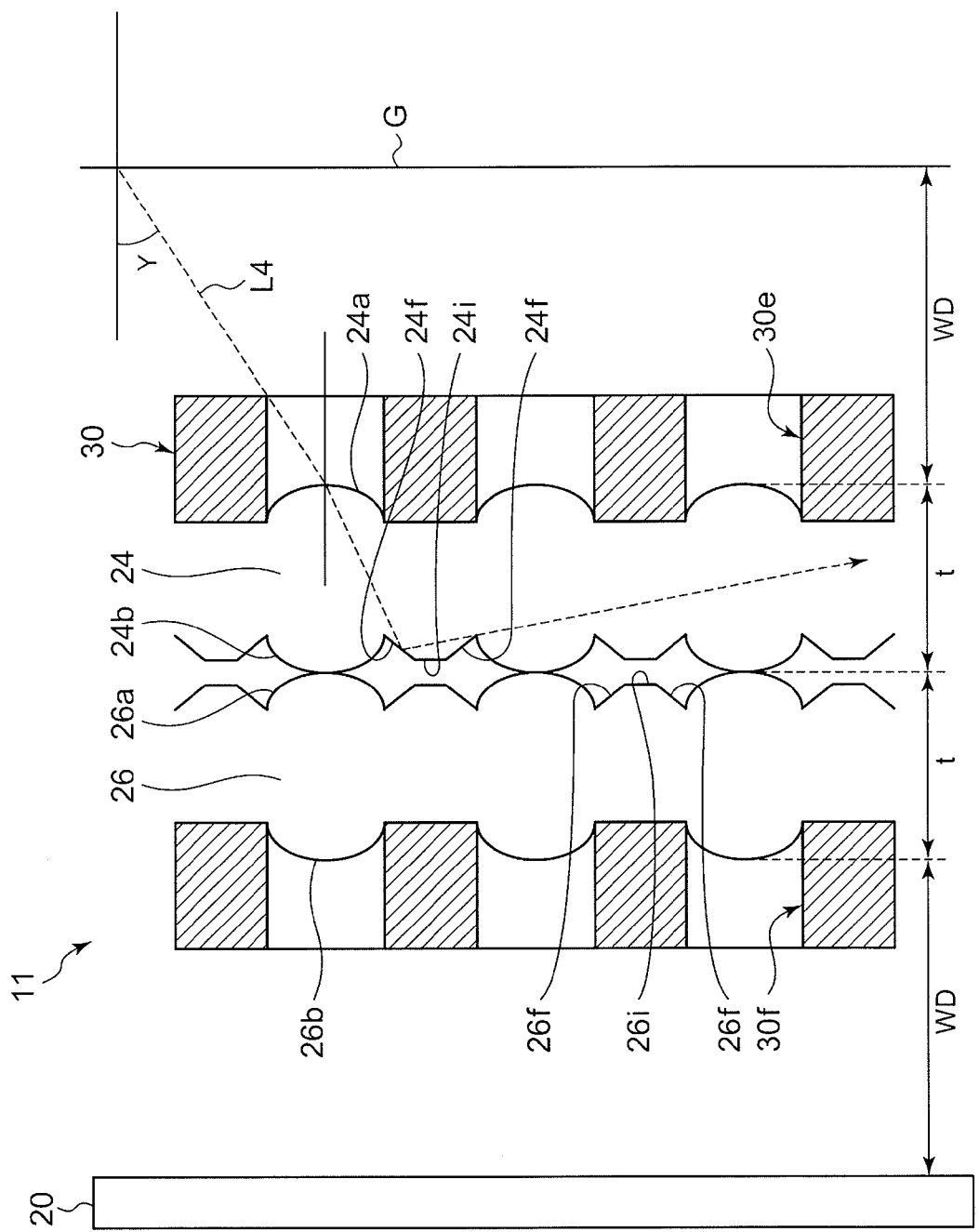
FIG. 26 shows a variation of embodiment concerning the erecting equal-magnification lens array plate.

FIG. 26 shows a variation of embodiment concerning the erecting equal-magnification lens array plate. FIGS. 5 and 6 show that the upper edges of adjacent slopes are in contact with each other. As a result, the neighborhood of the area of contact between adjacent slopes will be thin. As a result, the mechanical strength is slightly decreased. To address this in this embodiment, spacing is provided between adjacent slopes 24f and between adjacent slopes 26f so as to form flat parts 24i and 26i. This eliminates thin portions so that the mechanical strength of the erecting equal-magnification lens array plate is improved.

According to this variation, however, the light beam passing through the flat parts 24i and 26i may create ghost noise. It is therefore necessary to design the flat parts 24i and 26i according to the variation so that the light beam at the maximum angle of incidence does not enter the flat parts 24i and 26i. This can be achieved by extending the lens pitch in accordance with the size of the flat parts 24i and 26i.

Described above is an explanation based on an exemplary embodiment. The embodiment is intended to be illustrative only and it will be obvious to those skilled in the art that various modifications to constituting elements and processes could be developed and that such modifications are also within the scope of the present invention.

For example, the embodiment described above requires defining the angle of the slope so that the incident light beam is totally reflected. However, the angle of the slope need not necessarily to meet the condition for total reflection. Any slope formed at least around each second lens and/or third lens causes at least a part of the light beam diagonally incident on the slope to be refracted or reflected. This will decrease the likelihood of the light beam exiting from the second lens array plate so that ghost noise is reduced more successfully than in the comparative example of FIG. 7.

According to the above-described embodiment, the top of the second lens and the top of the third lens are in contact with each other. The present invention is equally useful where the second lens and the third lens are spaced apart, creating a space therebetween.

What is claimed is:

1. An erecting equal-magnification lens array plate comprising:
    a first lens array plate provided with a plurality of first lenses systematically arranged on a first surface and a plurality of second lenses systematically arranged on a second surface opposite to the first surface; and
    a second lens array plate provided with a plurality of third lenses systematically arranged on a third surface and a plurality of fourth lenses systematically arranged on a fourth surface opposite to the third surface;
    wherein the first lens array plate and the second lens array plate form a stack such that the second surface and the third surface face each other to ensure that a combination of the lenses aligned with each other form a coaxial lens system,
    the erecting equal-magnification lens array plate receives light from a linear light source facing the first surface and forms an erect equal-magnification image of the linear light source on an image plane facing the fourth surface, and
    an annular slope is formed around each second lens and/or each third lens,
    wherein the slope is formed to radially extend from the outer periphery of each second lens and/or each third lens in a tapered shape.

2. The erecting equal-magnification lens array plate according to claim 1,
    wherein the angle of the slope is defined so that a light beam incident on the slope is totally reflected.

3. The erecting equal-magnification lens array plate according to claim 1,
    wherein the height of the slope is equal to the sag of the second lens and/or the third lens.

4. The erecting equal-magnification lens array plate according to claim 1, further comprising:
- a first light-shielding wall having a plurality of first through holes aligned with the first lenses, and provided on the first surface such that each of the first through holes is located directly opposite to the corresponding first lens; and
- a second light-shielding wall having a plurality of second through holes aligned with the fourth lenses, and provided on the fourth surface such that each of the second through holes is located directly opposite to the corresponding fourth lens;
- wherein at least one of the first through hole and the second through hole comprises:
- a lateral wall portion;
- an annular inner projection portion provided to project from an end of the lateral wall portion facing the lens; and
- an annular outer projection portion provided to project from an end of the lateral wall portion opposite to the end facing the lens,
- wherein the inner projection portion and the outer projection portion are not formed with a surface parallel to an optical axis.

5. The erecting equal-magnification lens array plate according to claim 4,
wherein the inner projection portion is formed to be tapered.

6. The erecting equal-magnification lens array plate according to claim 4,
wherein the outer projection portion is formed to be tapered.

7. An optical scanning unit comprising:
- a linear light source configured to illuminate an image to be read;
- the erecting equal-magnification lens array plate according to claim 1 configured to condense light reflected by the image to be read; and
- a line image sensor configured to receive light transmitted through the erecting equal-magnification lens array plate.

8. An image reading device comprising:
- the optical scanning unit according to claim 7; and
- an image processing unit configured to process an image signal detected by the optical scanning unit.

* * * * *